United States Patent
Aoki

(10) Patent No.: US 10,996,320 B2
(45) Date of Patent: May 4, 2021

(54) ELECTRONIC DEVICE AND CONTROL METHOD OF ELECTRONIC DEVICE

(71) Applicant: Sony Semiconductor Solutions Corporation, Kanagawa (JP)

(72) Inventor: Takeshi Aoki, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 16/628,605

(22) PCT Filed: Apr. 3, 2018

(86) PCT No.: PCT/JP2018/014204
§ 371 (c)(1),
(2) Date: Jan. 3, 2020

(87) PCT Pub. No.: WO2019/012756
PCT Pub. Date: Jan. 17, 2019

(65) Prior Publication Data
US 2020/0209393 A1    Jul. 2, 2020

(30) Foreign Application Priority Data
Jul. 11, 2017  (JP) .............................. JP2017-135119

(51) Int. Cl.
*G01S 3/00*    (2006.01)
*G01S 7/481*   (2006.01)
(Continued)

(52) U.S. Cl.
CPC .......... *G01S 7/4815* (2013.01); *G01S 7/4914* (2013.01); *G01S 17/32* (2013.01); *G01S 17/89* (2013.01)

(58) Field of Classification Search
CPC ........ G01S 17/32; G01S 17/89; G01S 7/4914; G01S 7/484; G01S 7/4815
(Continued)

(56) References Cited

U.S. PATENT DOCUMENTS 5,694,130 A    12/1997 Suzuki et al.
9,294,754 B2*  3/2016 Billerbeck .............. G01S 7/484
(Continued)

FOREIGN PATENT DOCUMENTS

EP    2096459 A2    9/2009
JP    08-189965 A   7/1996
(Continued)

OTHER PUBLICATIONS

Extended European Search Report dated Jun. 17, 2020 for corresponding European Application No. 18831376.1.
(Continued)

*Primary Examiner* — Mark Hellner
(74) *Attorney, Agent, or Firm* — Michael Best & Friedrich LLP

(57) ABSTRACT

An appropriate light emission frequency is set in an electronic device that determines a phase difference between radiation light and reflected light. The electronic device includes a light emission unit, a determination unit, and a setting unit. The light emission unit radiates intermittent light in synchronization with a synchronization signal at a set frequency that is set. The light reception unit generates received light data by receiving reflected light of the intermittent light. The determination unit determines presence or absence of a predetermined object on the basis of the received light data. The setting unit sets, in the light emission unit, as the set frequency, a frequency that is higher, the smaller the distance to the predetermined object, in a case where presence of the predetermined object is determined.

15 Claims, 28 Drawing Sheets

(51) Int. Cl.
    *G01S 7/4914*     (2020.01)
    *G01S 17/32*     (2020.01)
    *G01S 17/89*     (2020.01)

(58) Field of Classification Search
    USPC ........................................................ 356/5.01
    See application file for complete search history.

(56) References Cited

U.S. PATENT DOCUMENTS

| | | |
|---|---|---|
| 2013/0201288 A1 | 8/2013 | Billerbeck et al. |
| 2014/0240317 A1 | 8/2014 | Go et al. |
| 2015/0285653 A1 | 10/2015 | Tachibana |

FOREIGN PATENT DOCUMENTS

| | | |
|---|---|---|
| JP | 2011-123071 A | 6/2011 |
| JP | 2011-179925 A | 9/2011 |
| JP | 2012-501608 A | 1/2012 |
| JP | 2015-227781 A | 12/2015 |

OTHER PUBLICATIONS

International Search Report dated Jul. 3, 2019 for corresponding International Application No. PCT/JP2018/014204.
International Written Opinion dated Jul. 3, 2019 for corresponding International Application No. PCT/JP2018/014204.
International Preliminary Report on Patentability dated Jan. 14, 2020 for corresponding International Application No. PCT/JP2018/014204.

\* cited by examiner a b a b

FIG. 7

| DISTANCE (m) | DELAY TIME (s) |
|---|---|
| 1.0 | 6.671E-09 |
| 2.0 | 1.134E-08 |
| 3.0 | 2.001E-08 |
| 4.0 | 2.669E-08 |
| 5.0 | 3.336E-08 |
| 6.0 | 4.003E-08 |
| 7.0 | 4.670E-08 |
| 8.0 | 5.337E-08 |
| 9.0 | 6.004E-08 |
| 10.0 | 6.671E-08 |

|  | DISTANCE MEASUREMENT AT HIGH LIGHT EMISSION FREQUENCY | DISTANCE MEASUREMENT AT LOW LIGHT EMISSION FREQUENCY |
|---|---|---|
| MEASURABLE DISTANCE | SMALL | GREAT |
| DISTANCE MEASUREMENT ACCURACY | HIGH | LOW |
| POWER CONSUMPTION | HIGH | LOW | a b

| DISTANCE RANGE (m) | FREQUENCY |
|---|---|
| LESS THAN Dth1 | fm1 |
| Dth1 OR MORE, LESS THAN Dth2 | fm2 |
| Dth2 OR MORE, LESS THAN Dth3 | fm3 |
| Dth3 OR MORE, LESS THAN Dth4 | fm4 |
| ⋮ | ⋮ |

NEAR ↑↓ FAR

HIGH ↑↓ LOW a b

US 10,996,320 B2

ELECTRONIC DEVICE AND CONTROL METHOD OF ELECTRONIC DEVICE

TECHNICAL FIELD

The present technology relates to an electronic device, and a control method of the electronic device, or more specifically, to an electronic device including a distance measurement function of measuring a distance to an object, and a control method of the electronic device.

BACKGROUND ART

Conventionally, there is known a distance measurement method called a time-of-flight (ToF) method with respect to an electronic device including a distance measurement function. The ToF method is a method of measuring a distance by radiating radiation light from an electronic device onto an object, and by determining a round-trip time until the radiation light returns to the electronic device after being reflected, and the method may be roughly categorized into a direct method and an indirect method. Of these, the direct method is a method of radiating light pulse of an extremely short emission time as radiation light, and of actually measuring a round-trip time until the light returns. According to the direct method, a distance may be measured for only one point by one pulse light emission, and scanning has to be sequentially performed to measure the distance for a large number of points, and thus, time is required.

On the other hand, the indirect method is a method of measuring a distance by radiating intermittent light, such as a sine wave or a square wave, as the radiation light, by determining a phase difference between reflected light of the radiation light and the radiation light, and by indirectly acquiring a round-trip time from the phase difference. For example, there is proposed a camera that measures a distance by the indirect method by receiving reflected light by a plurality of pixels (see Patent Document 1, for example).

CITATION LIST

Patent Document

Patent Document 1: JP 2012-501608 A

SUMMARY OF THE INVENTION

Problems to be Solved by the Invention

According to the conventional technique described above, a distance may be simultaneously measured for a plurality of points by a plurality of pixels, and thus, distance measurement may be performed in a short time compared to the direct method according to which distance measurement can be performed for only one point at a time. However, with the camera described above, it is difficult to set an appropriate value for a light emission frequency of the radiation light. If a high light emission frequency is set, distance measurement accuracy is increased, but a maximum distance that can be measured is reduced, and distance measurement cannot be performed in a case of a faraway object. On the other hand, if a low light emission frequency is set, the maximum distance is increased, but the distance measurement accuracy is reduced. The distance to an object is not known at the time of start of measurement, and thus, it is difficult to set an appropriate light emission frequency according to the distance.

The present technology has been attained in view of such circumstances, and has its object to set an appropriate light emission frequency in an electronic device for determining a phase difference between radiation light and reflected light.

Solutions to Problems

The present technology has been made to solve the problems described above, and a first aspect of the present technology is an electronic device and a control method of the electronic device, the electronic device including a light emission unit configured to radiate intermittent light in synchronization with a synchronization signal at a set frequency that is set; a light reception unit configured to generate received light data by receiving reflected light of the intermittent light; a determination unit configured to determine presence or absence of a predetermined object on the basis of the received light data; and a setting unit configured to set, in the light emission unit, as the set frequency, a frequency that is higher, the smaller a distance to the predetermined object, in a case where presence of the predetermined object is determined. An advantageous effect may thus be achieved according to which the intermittent light is radiated at a higher frequency, the smaller the distance to the predetermined object.

Furthermore, in the first aspect, in an initial state, the setting unit may set a first frequency as the set frequency, and in a case where presence of the predetermined object is determined, the setting unit may set a second frequency that is higher, the smaller the measured distance, as the set frequency. An advantageous effect may thus be achieved according to which intermittent light at the first frequency is radiated in the initial state, and intermittent light at the second frequency is radiated in a case where presence of a predetermined object is determined.

Furthermore, in the first aspect, in a case of determining presence of the predetermined object, the determination unit may determine presence or absence of a specific part in the predetermined object, and in a case where presence of the specific part is determined, the setting unit may set a third frequency that is higher, the smaller a distance to the specific part, as the set frequency. An advantageous effect may thus be achieved according to which intermittent light at the third frequency is radiated, in a case where presence of a specific part is determined.

Furthermore, in the first aspect, there may be further included a frequency control unit configured to alternately switch between the first frequency and the second frequency every specific period of time, in a case where the second frequency is set. An advantageous effect may thus be achieved according to which intermittent light at the first frequency and intermittent light at the second frequency are alternately radiated, in a case where presence of a predetermined object is determined.

Furthermore, in the first aspect, the light reception unit may include a pixel array unit where a plurality of pixels is arrayed in a two-dimensional lattice, and a driver configured to alternately perform, in a case where presence of the predetermined object is determined, a process of driving, over a specific period of time, a pixel, among the plurality of pixels, that receives the reflected light from other than the predetermined object and of causing image data including the received light data to be output as a first subframe, and a process of driving, over the specific period of time, a pixel, among the plurality of pixels, that receives the reflected light from the predetermined object and of causing image data including the received light data to be output as a second subframe. An advantageous effect may thus be achieved according to which the first subframe and the second subframe are alternately output, in a case where presence of a predetermined object is determined.

Furthermore, in the first aspect, there may be further included a synthesis processing unit configured to synthesize the first subframe and the second subframe, and to generate distance data on the basis of data obtained by synthesis. An advantageous effect may thus be achieved according to which the first subframe and the second subframes are synthesized.

Furthermore, in the first aspect, the light reception unit may include a first light reception unit and a second light reception unit each configured to radiate intermittent light in synchronization with a synchronization signal at the set frequency, and in an initial state, the setting unit may set, in the first light reception unit, the first frequency as the set frequency, and in a case where presence of the predetermined object is determined, the setting unit may set, in the second light reception unit, a second frequency that is higher, the smaller the measured distance, as the set frequency. An advantageous effect may thus be achieved according to which the first frequency is set in the first light reception unit in the initial state, and the second frequency is set in the second light reception unit in a case where presence of a predetermined object is determined.

Furthermore, in the first aspect, there may be further included: a first optical unit configured to condense the intermittent light, and to guide the intermittent light to the first light reception unit; a second optical unit configured to condense the intermittent light, and to guide the intermittent light to the first light reception unit; and a zoom control unit configured to control a zoom magnification of the first optical unit on the basis of the measured distance. An advantageous effect may thus be achieved according to which intermittent light at the first frequency is condensed by the first optical unit, the zoom magnification of which is according to the measured distance.

Furthermore, in the first aspect, the light emission unit may include a first light emission unit and a second light emission unit each configured to radiate intermittent light in synchronization with a synchronization signal at the set frequency, and in an initial state, the setting unit may set, in the first light emission unit, the first frequency as the set frequency, and in a case where presence of the predetermined object is determined, the setting unit may set, in the second light emission unit, the second frequency that is higher, the smaller the measured distance, as the set frequency. An advantageous effect may thus be achieved according to which intermittent light at the first frequency and intermittent light at the second frequency are radiated, in a case where presence of a predetermined object is determined.

Furthermore, in the first aspect, the light reception unit may generate, in a chronological order, a plurality of pieces of image data each including a predetermined number of pieces of the received light data, and the determination unit may determine presence or absence of the predetermined object on the basis of a difference between two pieces of image data, among the plurality of pieces of image data, that are adjacent to each other in the chronological order. An advantageous effect may thus be achieved according to which presence or absence of an object is determined on the basis of a difference between two pieces of image data.

Furthermore, in the first aspect, the determination unit may further calculate a statistic of distance on the basis of the received light data, and may determine presence or absence of the predetermined object on the basis of the difference and the statistic. An advantageous effect may thus be achieved according to which presence or absence of an object is determined on the basis of a difference between two pieces of image data and the statistic of the distance.

Effects of the Invention

The present technology achieves advantageous effects that an appropriate light emission frequency may be set in an electronic device for determining a phase difference between radiation light and reflected light. Additionally, the effects described here are not necessarily restrictive, and any effect described in the present disclosure may be achieved.

BRIEF DESCRIPTION OF DRAWINGS

FIG. 7 is a diagram according to the first embodiment of the present technology, showing an example of delay time for each distance.

FIG. 15 is a diagram according to the first embodiment of the present technology, showing an example of a frequency table.

MODE FOR CARRYING OUT THE INVENTION

Figure 1:
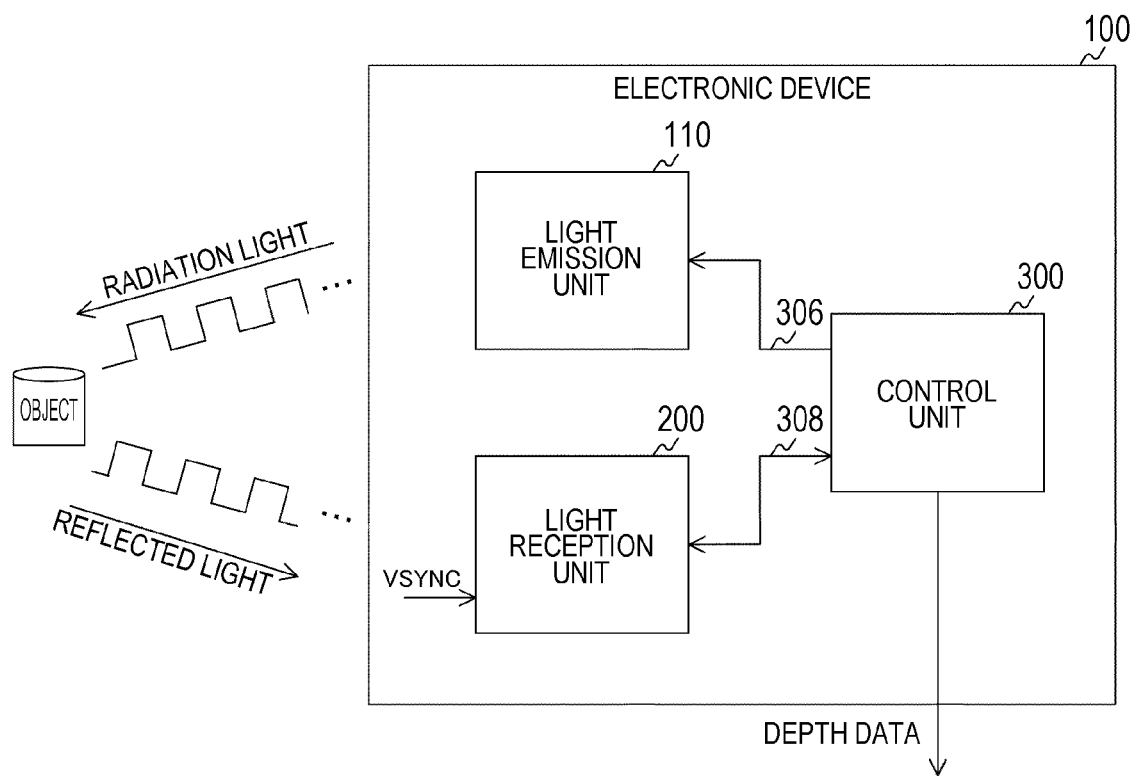
FIG. 1 is a block diagram according to a first embodiment of the present technology, showing an example configuration of an electronic device.

Hereinafter, modes for carrying out the present technology (hereinafter referred to as embodiment(s)) will be described. A description will be given in the following order.
1. First Embodiment (Example of Setting Frequency According to Distance to Object)
2. Second Embodiment (Example of Setting Frequency According to Distance to Object with Respect to One Light Emission Unit and Two Light Reception Units)
3. Third Embodiment (Example of Setting Frequency According to Distance to Object with Respect to Two Light Emission Units and Two Light Reception Units)
4. Example Application to Mobile Body 1. First Embodiment (Example Configuration of Electronic Device)
FIG. 1 is a block diagram according to a first embodiment of the present technology, showing an example configuration of an electronic device 100. The electronic device 100 is a device which is capable of measuring a distance to an object by a ToF method, and includes a light emission unit 110, a light reception unit 200, and a control unit 300.

The light emission unit 110 radiates intermittent light in synchronization with a synchronization signal at a frequency set by the control unit 300. For example, near-infrared light is used as radiation light. Furthermore, a square-wave clock signal is used as the synchronization signal. Additionally, a sine-wave signal may also be used as the synchronization signal.

The light reception unit 200 receives reflected light of the intermittent light, and generates received light data. The light reception unit 200 generates image data including a predetermined number of pieces of received light data in synchronization with a vertical synchronization signal VSYNC, and supplies the image data to the control unit 300 through a signal line 308. A frequency of the vertical synchronization signal VSYNC is 30 hertz (Hz), for example. Additionally, an optical unit for condensing reflected light and guiding the light to the light reception unit 200 is arranged in a preceding stage of the light reception unit 200, but illustration of the optical unit is omitted from FIG. 1 for the sake of convenience.

The control unit 300 controls the light emission unit 110 and the light reception unit 200. The control unit 300 supplies to the light emission unit 110, through a signal line 306, a plurality of clock signals at different frequencies, and a selection signal for selecting one of the clock signals. Furthermore, the control unit 300 transmits to the light reception unit 200, through the signal line 308, a plurality of clock signals at different frequencies, a selection signal for selecting one of the clock signals, and region information. The frequencies of the clock signals are higher than that of the vertical synchronization signal, and range from 10 to 20 megahertz (MHz), for example. The region information will be described later in detail.

Moreover, the control unit 300 receives received light data from the light reception unit 200 through the signal line 308. The control unit 300 measures a distance to an object on the basis of the received light data, and generates and outputs depth data indicating a measurement value. For example, the depth data is used in image processing of performing blurring at a degree according to the distance, gesture recognition, and the like.

Figure 2:
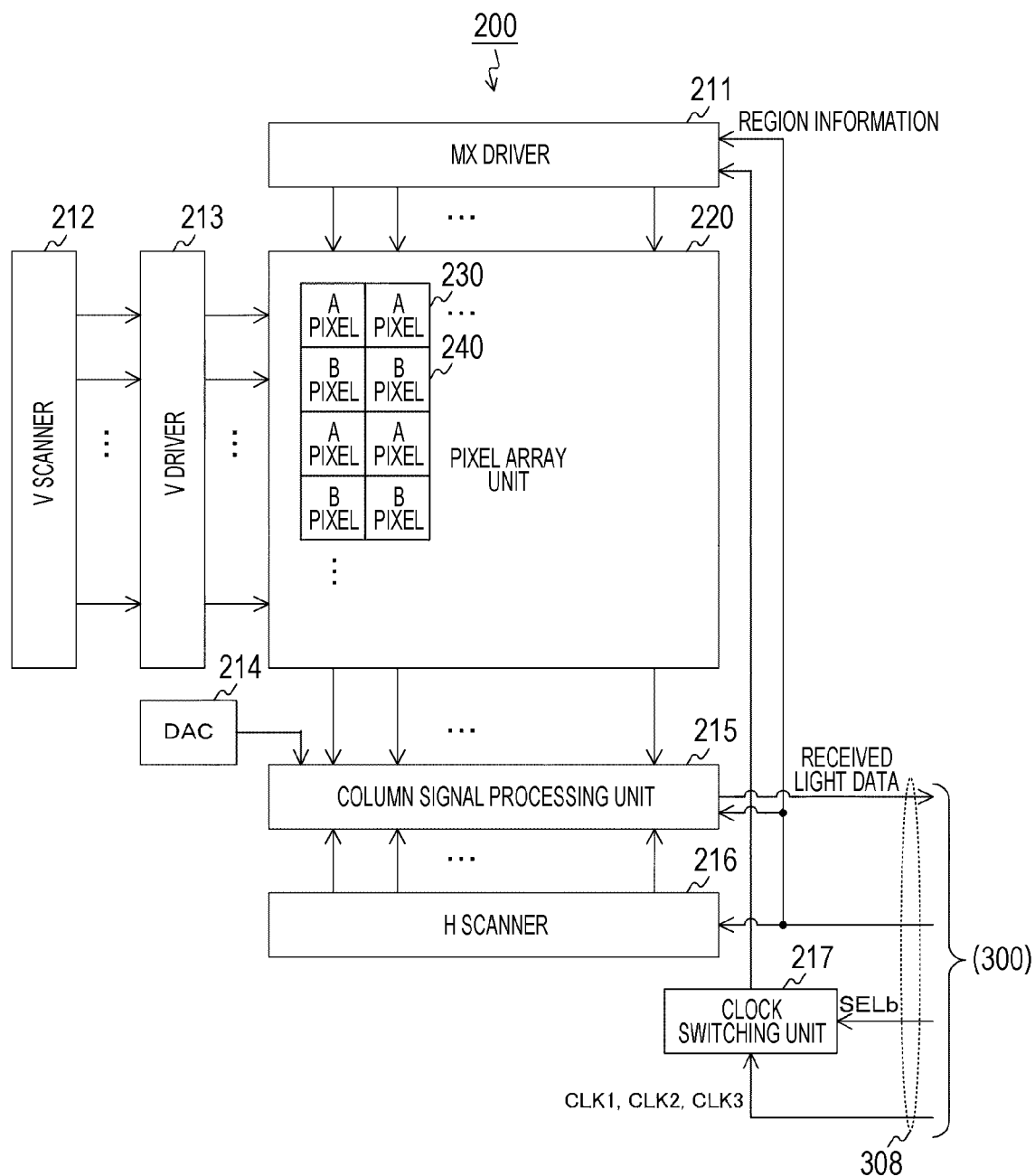
FIG. 2 is a block diagram according to the first embodiment of the present technology, showing an example configuration of a light reception unit.

(Example Configuration of Light Reception Unit)
FIG. 2 is a block diagram according to the first embodiment of the present technology, showing an example configuration of the light reception unit 200. The light reception unit 200 includes an MX driver 211, a V scanner 212, a V driver 213, a pixel array unit 220, and a digital-to-analog converter (DAC) 214. The light reception unit 200 further includes a column signal processing unit 215, an H scanner 216, and a clock switching unit 217. Furthermore, a plurality of pixels is arrayed in a two-dimensional lattice in the pixel array unit 220. Half of the pixels are A pixels 230, and the rest are B pixels 240.

In the following, with respect to the pixel array unit 220, a group of pixels arrayed in a predetermined direction (such as a horizontal direction) will be referred to as a "row" or a "line", and a group of pixels arrayed in a direction perpendicular to the row will be referred to as a "column". Furthermore, the number of rows in the pixel array unit 220 will be given as M (where M is an integer), and the number of columns will be given as N (where N is an integer). For example, the A pixels 230 are arranged in odd columns, and the B pixels 240 are arranged in even columns.

The V scanner 212 sequentially selects a row in synchronization with a horizontal synchronization signal at a higher frequency than the vertical synchronization signal. The V driver 213 drives the row selected by the V scanner 212.

The MX driver 211 selects and drives a column on the basis of the region information. Here, the region information is information indicating, for each column, whether or not to drive the column. Furthermore, the MX driver 211 drives the A pixel 230 in synchronization with a clock signal from the clock switching unit 217, and drives the B pixel 240 in synchronization with a signal, a phase of which is different from that of the clock signal by 180 degrees. Additionally, the MX driver 211 is an example of a driver described in the claims.

The DAC 214 generates a sawtooth wave ramp signal by digital-to-analog (DA) conversion, and supplies the signal to the column signal processing unit 215.

The A pixel 230 photoelectrically converts incident light, and generates an electrical signal. The A pixel 230 supplies the generated electrical signal to the column signal processing unit 215 as a pixel signal, under control of the V driver 213. A configuration of the B pixel 240 is similar to that of the A pixel 230.

The column signal processing unit 215 selects a column on the basis of the region information, and performs predetermined signal processing, such as an analog-to-digital (AD) conversion process, on a pixel signal from the column. Under control of the H scanner 216, the column signal processing unit 215 supplies, to the control unit 300, data after signal processing as the received light data. In a case where all the columns are selected, image data including M×N pieces of received light data is generated.

The H scanner 216 sequentially selects a column on the basis of the region information, and causes the received light data of the column to be output to the column signal processing unit 215.

The clock switching unit 217 selects one of clock signals CLK1, CLK2, or CLK3 supplied by the control unit 300, according to a selection signal SELb from the control unit 300. Here, the selection signal SELb is a signal indicating one of the clock signals CLK1, CLK2, or CLK3. Moreover, frequencies of the clock signals CLK1, CLK2, and CLK3 are f1, f2, and f3, respectively, and are different from one another. The clock switching unit 217 supplies the selected clock signal to the MX driver 211.

(Example Configuration of Pixel)

Figure 3:
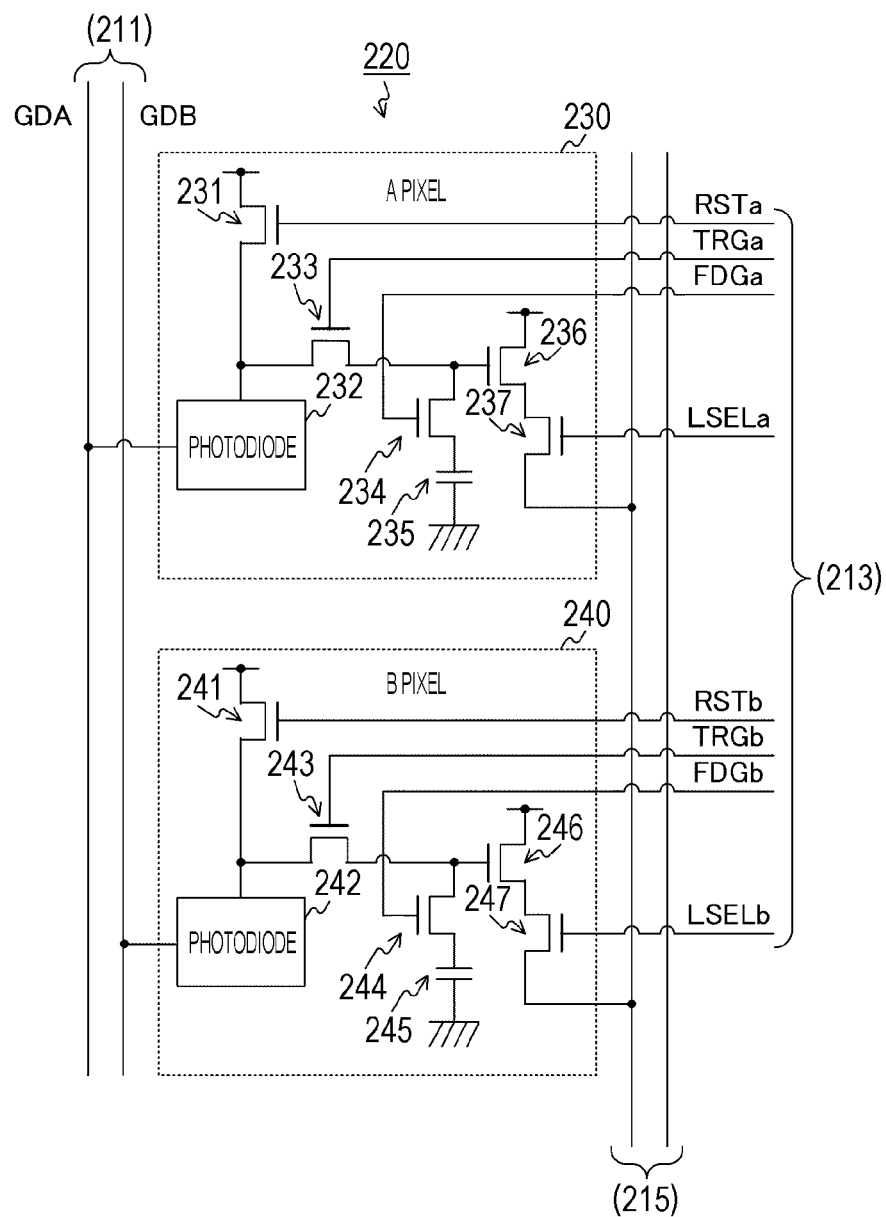
FIG. 3 is a circuit diagram according to the first embodiment of the present technology, showing an example configuration of an A pixel and a B pixel.

FIG. 3 is a circuit diagram according to the first embodiment of the present technology, showing an example configuration of the A pixel 230 and the B pixel 240. The A pixel 230 includes a reset transistor 231, a photodiode 232, a transfer transistor 233, a connection transistor 234, a floating diffusion layer 235, an amplifying transistor 236, and a select transistor 237.

The reset transistor 231 resets the amount of charge in the photodiode 232 and the floating diffusion layer 235 according to a reset signal RSTa from the V driver 213.

The photodiode 232 performs photoelectric conversion in synchronization with a drive signal GDA from the MX driver 211, and generates charge. As the photodiode 232, an avalanche photodiode is used, for example. Furthermore, as the drive signal GDA, the clock signal from the clock switching unit 217 is used.

The transfer transistor 233 transfers charge from the photodiode 232 to the floating diffusion layer 235 according to a transfer signal TRGa from the V driver 213. The connection transistor 234 connects the floating diffusion layer 235 to the transfer transistor 233 and the amplifying transistor 236 according to a connection signal FDGa from the V driver 213.

The floating diffusion layer 235 accumulates the transferred charge, and generates voltage according to the amount of accumulated charge. The amplifying transistor 236 amplifies a signal of the voltage generated by the floating diffusion layer 235. The select transistor 237 outputs, to the column signal processing unit 215, the signal from the amplifying transistor 236 as a pixel signal, according to a row selection signal LSELa from the V driver 213.

The B pixel 240 includes a reset transistor 241, a photodiode 242, a transfer transistor 243, a connection transistor 244, a floating diffusion layer 245, an amplifying transistor 246, and a select transistor 247. These elements are configured in a similar manner as corresponding elements of the A pixel 230. However, the photodiode 242 generates charge by performing photoelectric conversion in synchronization with a drive signal GDB from the MX driver 211. For example, a signal that is inverted (or in other words, with a phase that is different by 180 degrees) from the clock signal from the clock switching unit 217 is used as the drive signal GDB.

Figure 4:
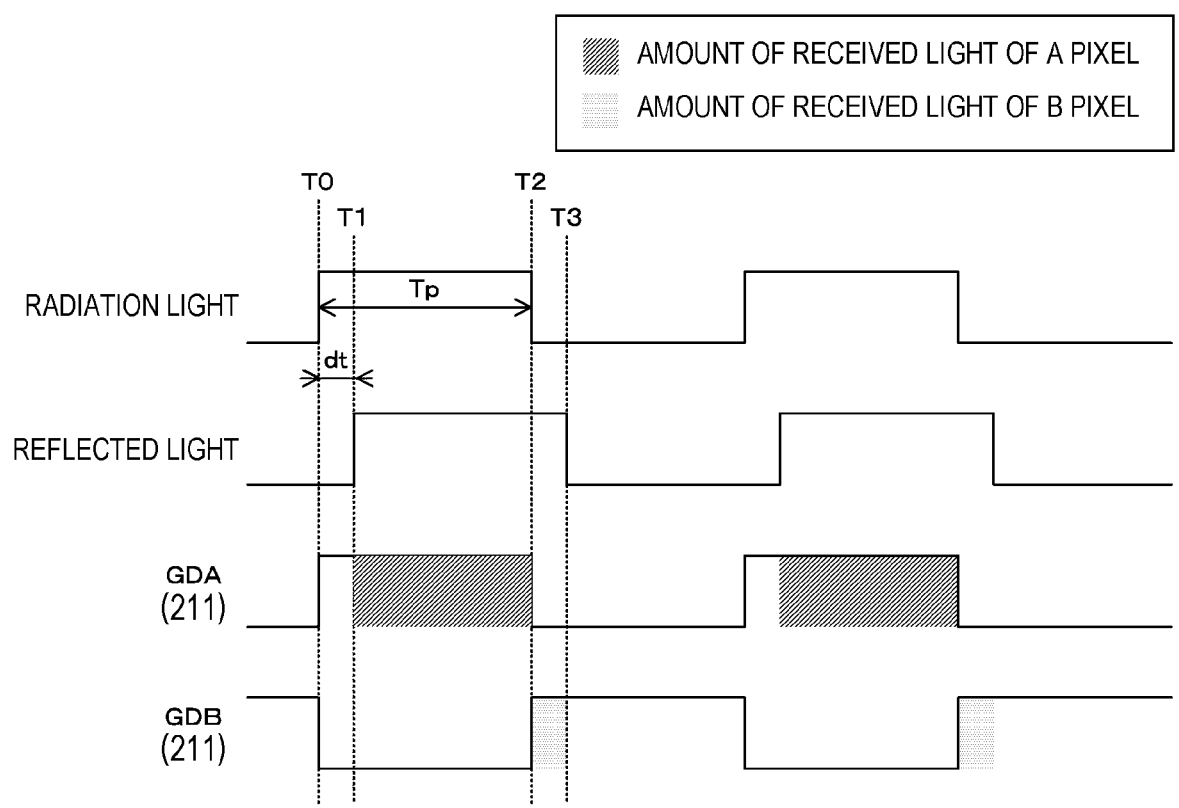
FIG. 4 is a diagram according to the first embodiment of the present technology, showing an example of an amount of received light of the A pixel and the B pixel.

FIG. 4 is a diagram according to the first embodiment of the present technology, showing an example of an amount of received light of the A pixel 230 and the B pixel 240.

The light emission unit 110 radiates intermittent light as radiation light, in synchronization with a clock signal at a frequency that is set by the control unit 300. A cycle of the clock signal is given as 2×Tp. The radiation light is reflected by a predetermined object, and the reflected light is received by the light reception unit 200. A phase difference dt is caused between the reflected light and the radiation light, according to the distance to the object. A relationship between the phase difference dt and a distance D to the object is expressed by the following formula.

[Math. 1]
$$D = c \times \frac{dt}{2} = \frac{Rc}{4\pi f} \qquad \text{Formula 1}$$

In the formula given above, "c" is light speed, and a unit is meter per second (m/s), for example. A unit of the phase difference dt is in seconds (s), for example. A unit of the distance D is in meters (m), for example. "R" is a phase angle between the radiation light and the reflected light, and a unit is in "degrees", for example. "f" is a light emission frequency of the radiation light, and a unit is in hertz (Hz), for example.

Furthermore, the MX driver 211 drives the A pixel 230 in synchronization with the drive signal GDA, phase and frequency of which are the same as those of a clock signal used by the light emission unit 110, and causes the A pixel 230 to receive the reflected light. On the other hand, the MX driver 211 drives the B pixel 240 in synchronization with the drive signal GDB, a frequency of which is the same as that of the clock signal used by the light emission unit 110 but a phase of which is different from that of the clock signal by 180 degrees, and causes the B pixel 240 to receive the reflected light.

In a case where the radiation light is emitted from a certain timing T0 to a timing T2, emission of reflected light is started at a timing T1, after a lapse of dt from the timing T0. Then, the emission of the reflected light is stopped at a timing T3, after a lapse of dt from the timing T2.

At this time, the A pixel 230 receives the reflected light over a period between the timings T1 and T2, in synchronization with the drive signal GDA. The amount of received light here is given as q1. Because a high value ranging from 10 to 20 megahertz (MHz), for example, is set as the light emission frequency of the radiation light, the amount of received light q1 per one cycle is extremely small and difficult to detect. Accordingly, the light reception unit 200 accumulates each q1 over a cycle of the vertical synchronization signal, and generates a total amount as the amount of received light Q1.

Furthermore, the B pixel 240 receives the reflected light over a period between the timings T2 and T3, in synchronization with the drive signal GDB, the phase of which is different from that of the drive signal GDA by 180 degrees. The amount of received light here is given as q2. The light reception unit 200 accumulates each q2 over the cycle of the vertical synchronization signal, and generates a total amount as the amount of received light Q2. A relationship between the phase difference dt, and the amounts of received light Q1 and Q2 is expressed by the following formula.

$$dt = Tp \times \{Q2/(Q1+Q2)\} \qquad \text{Formula 2}$$

The control unit 300 may calculate the distance D by determining the phase difference dt by substituting the amounts of received light Q1 and Q2 into Formula 2, and by substituting the phase difference dt into Formula 1. In this manner, the control unit 300 may measure the distance D from the amounts of received light Q1 and Q2 of each pixel pair including the A pixel 230 and the B pixel 240. The number of A pixels 230 and the number of B pixels 240 are each half the total number of pixels M×N of the pixel array unit 220, and thus, the control unit 300 may determine the distance D for each of (M×N)/2 points.

Figure 5:
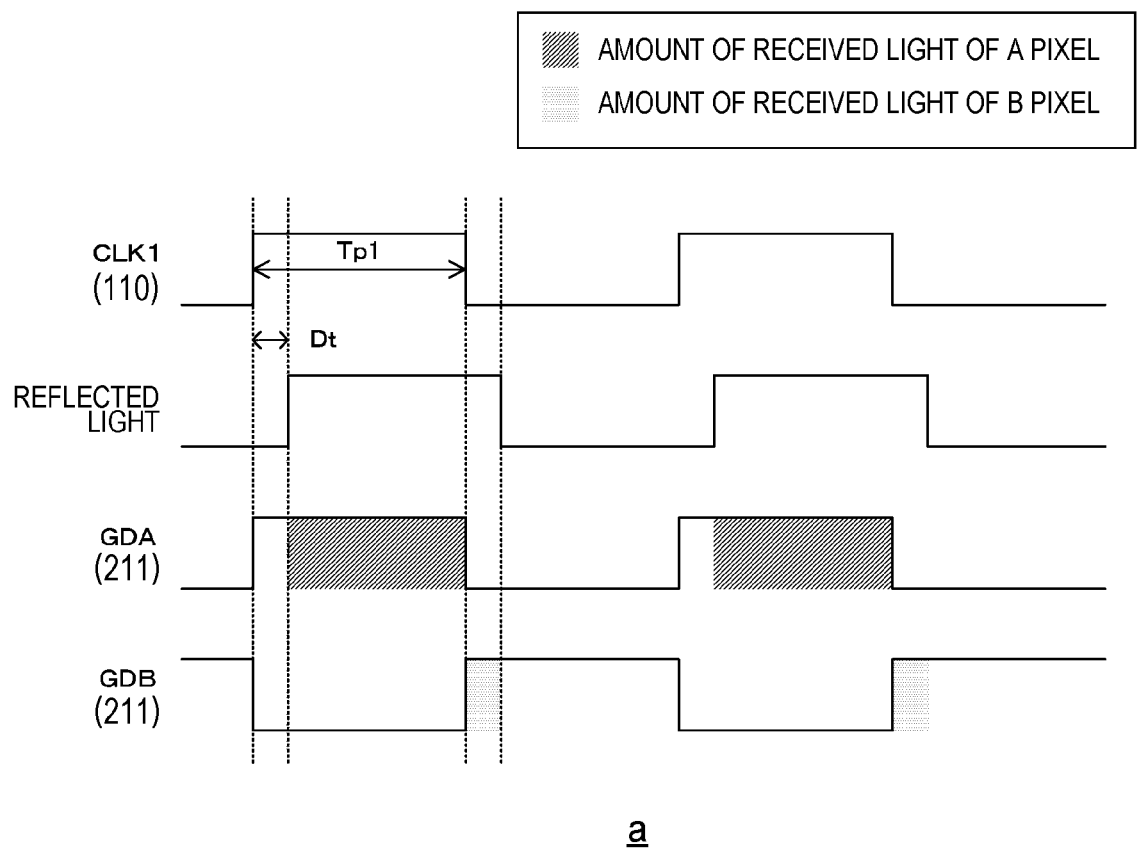
FIG. 5 is a diagram according to the first embodiment of the present technology, showing an example of the amount of received light of the A pixel and the B pixel in a case where a low frequency is set.
Figure 5:
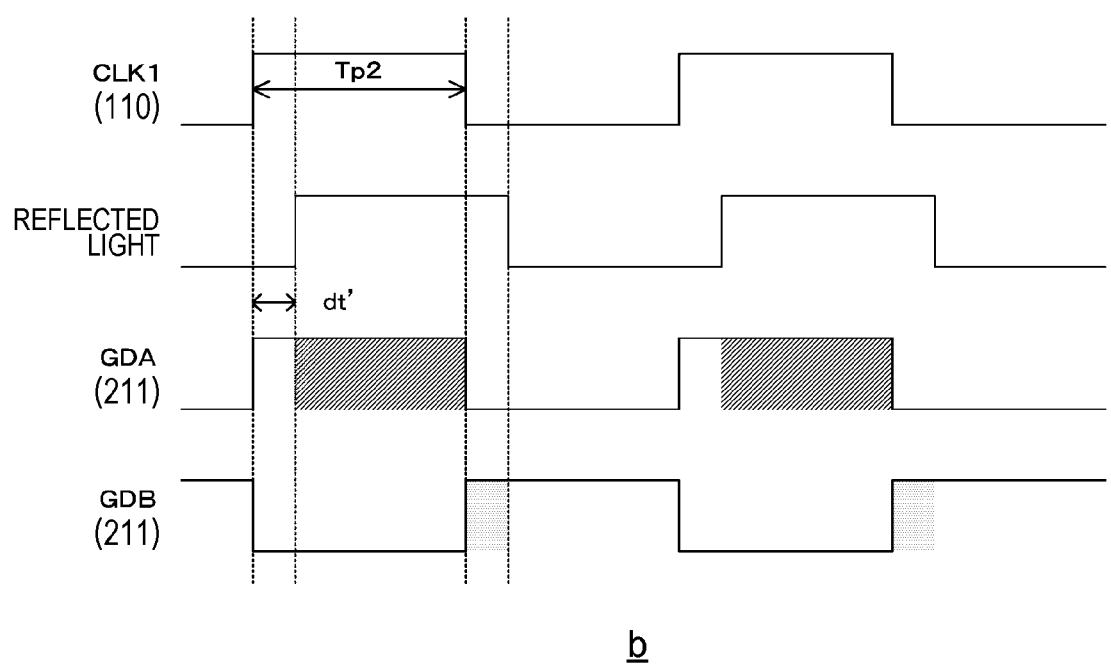

FIG. 5 is a diagram according to the first embodiment of the present technology, showing an example of the amount of received light of the A pixel 230 and the B pixel 240 in a case where a low frequency is set. In the drawing, a is a diagram showing an example of the amount of received light of the A pixel 230 and the B pixel 240 in a case where 10 megahertz (MHz) is set by the control unit 300 as the light emission frequency f, and the distance D is 1 meter (m). In the drawing, b is a diagram showing an example of the amount of received light of the A pixel 230 and the B pixel 240 in a case where 10 megahertz (MHz) is set by the control unit 300 as the light emission frequency f, and the distance D is 1.1 meters (m).

In a case where the distance D is 1 meter (m), the phase difference dt is about 6.6 nanoseconds (s). On the other hand, in a case where the distance D is 1.1 meters (m), a phase difference dt' is about 7.34 nanoseconds (s). A cycle is 100 nanoseconds (ns), and thus, in a case where the distance is changed by 10 centimeter (cm), the amount of change in the phase difference with respect to the cycle is less than 1% and is a small value.

Generally, the lower the light emission frequency, the longer the cycle 2×Tp becomes, and thus, by Formulae 1 and 2, the maximum distance that can be measured is increased. On the other hand, as described above, the amount of change in the phase difference with respect to the cycle is reduced, and distance measurement accuracy is reduced.

Figure 6:
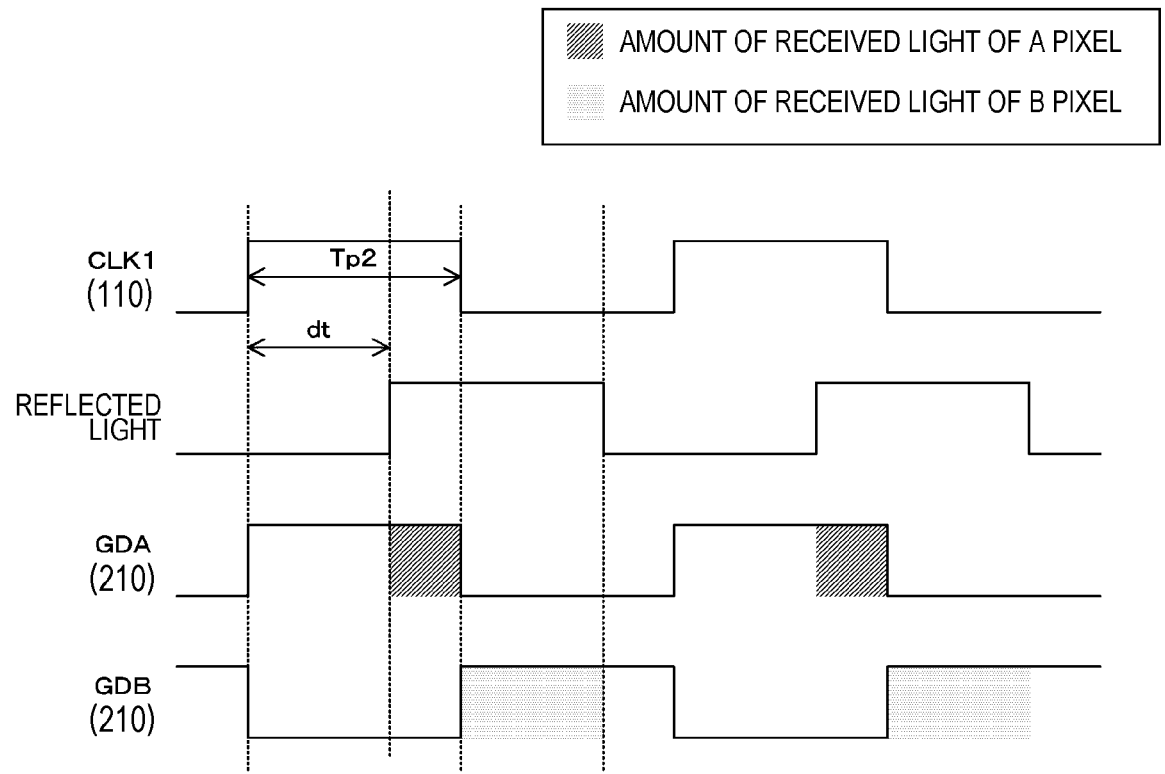
FIG. 6 is a diagram according to the first embodiment of the present technology, showing an example of the amount of received light of the A pixel and the B pixel in a case where a high frequency is set.
Figure 6:
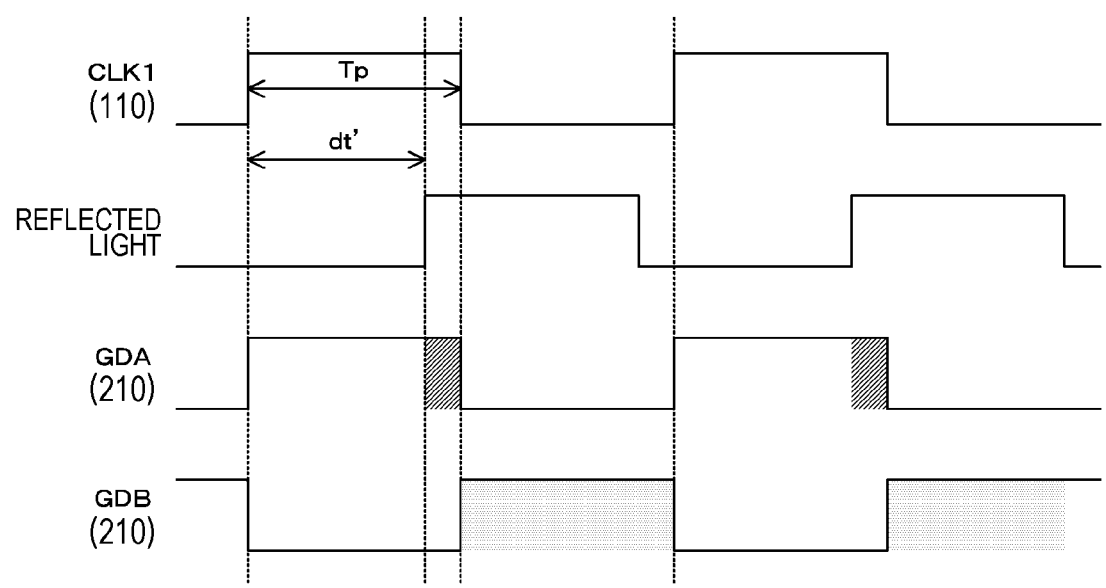

FIG. 6 is a diagram according to the first embodiment of the present technology, showing an example of the amount of received light of the A pixel 230 and the B pixel 240 in a case where a high frequency is set. In the drawing, a is a diagram showing an example of the amount of received light of the A pixel 230 and the B pixel 240 in a case where 100 megahertz (MHz) is set by the control unit 300 as the light emission frequency f, and the distance D is 1 meter (m). In the drawing, b is a diagram showing an example of the amount of received light of the A pixel 230 and the B pixel 240 in a case where 100 megahertz (MHz) is set by the control unit 300 as the light emission frequency f, and the distance D is 1.1 meters (m).

In a case where the distance D is 1 meter (m), the phase difference dt is about 6.6 nanoseconds (s). On the other hand, in a case where the distance D is 1.1 meters (m), the phase difference dt' is about 7.34 nanoseconds (s). The cycle is 10 nanoseconds (ns), and thus, in a case where the distance is changed by 10 centimeter (cm), the amount of change in the phase difference with respect to the cycle is greater than in a case where 10 megahertz (MHz) is set. The distance measurement accuracy is thereby increased. On the other hand, by Formulae 1 and 2, the maximum distance that can be measured is reduced. For example, in a case of 15 meters (m) or more, the phase difference dt is longer than one wavelength, and accurate measurement becomes impossible.

FIG. 7 is a diagram according to the first embodiment of the present technology, showing an example of delay time for each distance. The further the distance to an object, the more increase the round-trip time of light, and the more increased a delay in a light reception timing with respect to a radiation timing. For example, in a case where the light emission frequency is 10 megahertz (MHz), and the distance is 1.0 meter (m), the delay time is "6.671E-09" seconds. Furthermore, in a case where distance is 2.0 meters, the delay time is "1.134E-08" seconds and is longer than in a case where the distance is 1.0 meter.

Figures 8, 9:
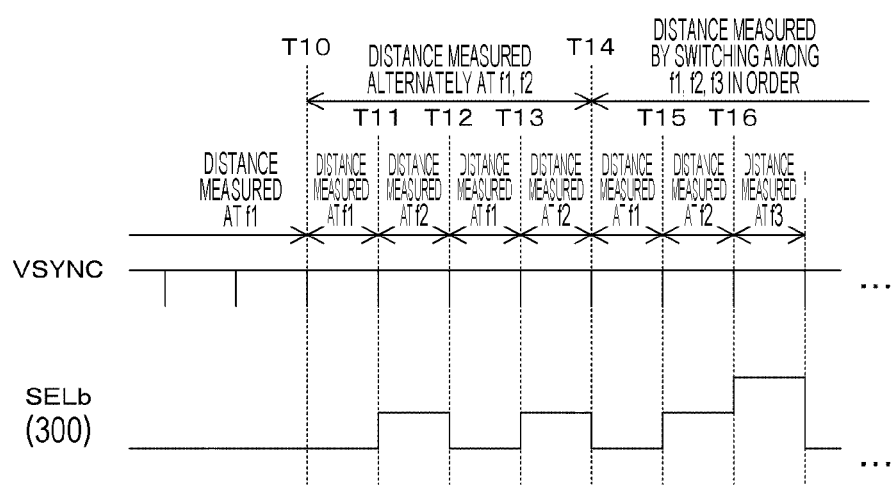
FIG. 8 is a diagram according to the first embodiment of the present technology, for describing a relationship between a light emission frequency and each of a measurable distance, distance measurement accuracy, and power consumption.
FIG. 9 is a timing chart according to the first embodiment of the present technology, showing an example of a frequency setting operation.

FIG. 8 is a diagram according to the first embodiment of the present technology, for describing a relationship between the light emission frequency and each of a measurable distance, distance measurement accuracy, and power consumption. As described with reference to FIGS. 5 to 7, if the control unit 300 increases the light emission frequency, the measurable distance is reduced, but the distance measurement accuracy is increased. Furthermore, if the light emission frequency is increased, the power consumption of the electronic device 100 is increased.

On the other hand, if the control unit 300 reduces the light emission frequency, the measurable distance is increased, but the distance measurement accuracy is reduced. Furthermore, if the light emission frequency is reduced, the power consumption of the electronic device 100 is reduced.

In this manner, there is a trade-off relationship between the measurable distance and the distance measurement accuracy. For example, if the distance to an object is less than 15 meters (m), distance measurement may be performed at a light emission frequency of either 10 megahertz (MHz) or 100 megahertz (MHz). However, because the distance measurement accuracy is higher at 100 megahertz (MHz), it is desirable to set 100 megahertz (MHz) in the above-described case. Moreover, if the distance to an object is 15 meters (m) or more, distance cannot be measured at the light emission frequency of 100 megahertz (MHz), and 10 megahertz (MHz) has to be set in spite of lower accuracy.

Moreover, there is a trade-off relationship also between the power consumption and the distance measurement accuracy. If the light emission frequency is increased, gesture recognition and the like may be performed with high accuracy due to increased distance measurement accuracy, but the power consumption is increased. Particularly with mobile appliances driven by battery, an increase in the power consumption is a problem. On the other hand, if the light emission frequency is reduced, the power consumption may be reduced, but the distance measurement accuracy is reduced, and safety may be impaired with respect to vehicle-mounted appliances and the like.

As described above, there are trade-off relationships with respect to the measurable distance, the distance measurement accuracy, and the power consumption, and thus, the light emission frequency has to be switched according to the situation.

FIG. 9 is a timing chart according to the first embodiment of the present technology, showing an example of a frequency setting operation. In an initial state, the control unit 300 sets a frequency f1 for the light emission unit 110 and the light reception unit 200. The light emission unit 110 emits light in synchronization with a clock signal at the frequency f1, and the light reception unit 200 receives reflected light in synchronization with the clock signal at the frequency f1. Then, the light reception unit 200 outputs image data (frame) including received light data, in synchronization with the vertical synchronization signal VSYNC.

The control unit 300 measures the distance on the basis of the frame from the light reception unit 200, and also, determines presence or absence of a predetermined object. Then, the control unit 300 is assumed to determine presence of the object at a timing T10. In such a case, the control unit 300 determines a frequency f2 which is higher, the smaller the distance to the object. Then, the frequency is switched in each cycle of the vertical synchronization signal VSYNC. For example, the control unit 300 selects the clock signal CLK1 at the frequency f1 according to the selection signal SELb, over a period between the timing T10 and a timing T11 when the cycle of the vertical synchronization signal VSYNC is elapsed. Next, the control unit 300 selects the clock signal CLK2 at the frequency f2 according to the selection signal SELb, over a period between the timing T11 and a timing T12 when the cycle of the vertical synchronization signal VSYNC is elapsed.

Furthermore, in a period where the frequencies f1 and f2 are alternately set, the control unit 300 determines presence or absence of a specific part (such as a hand) of the object on the basis of the frame. Then, it is assumed that the control unit 300 determines presence of a hand or the like at a timing T14. In such a case, the control unit 300 determines a frequency f3 which is higher, the smaller the distance to the hand. Then, the control unit 300 switches the frequency in each cycle of the vertical synchronization signal VSYNC. For example, the control unit 300 selects the clock signal CLK1 at the frequency f1 according to the selection signal SELb, over a period between the timing T14 and a timing T15 when the cycle of the vertical synchronization signal VSYNC is elapsed. Next, the control unit 300 selects the clock signal CLK2 at the frequency f2 according to the selection signal SELb, over a period between the timing T15 and a timing T16 when the cycle of the vertical synchronization signal VSYNC is elapsed. The control unit 300 selects the clock signal CLK3 at the frequency f3 according to the selection signal SELb, over a period between the timing T16 and a timing when the cycle of the vertical synchronization signal VSYNC is elapsed.

As the initial frequency f1, a frequency that is lower than the frequencies f2 and f3 are set, for example. Accordingly, in a case where there is no object, the power consumption of the electronic device 100 may be minimized at the lowest frequency. Furthermore, also after determination of presence of an object, the power consumption may be reduced by alternately setting the frequencies f1 and f2 than in a case where the frequency f2 is continuously set.

Figure 10:
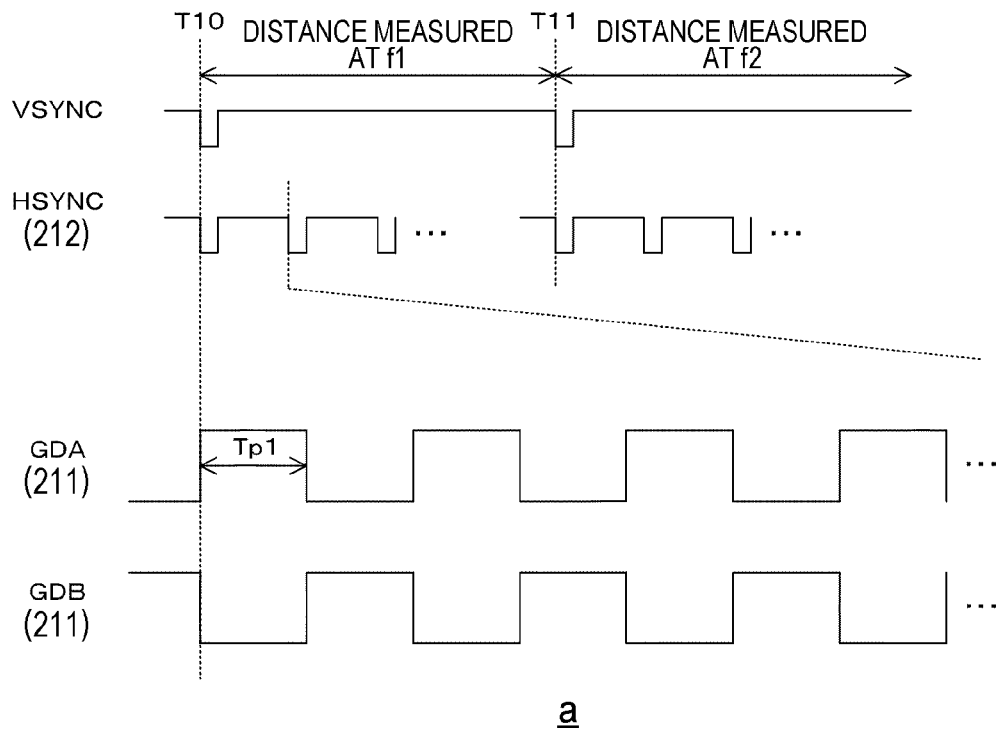
FIG. 10 is a timing chart according to the first embodiment of the present technology, showing an example operation of the light reception unit.
Figure 10:
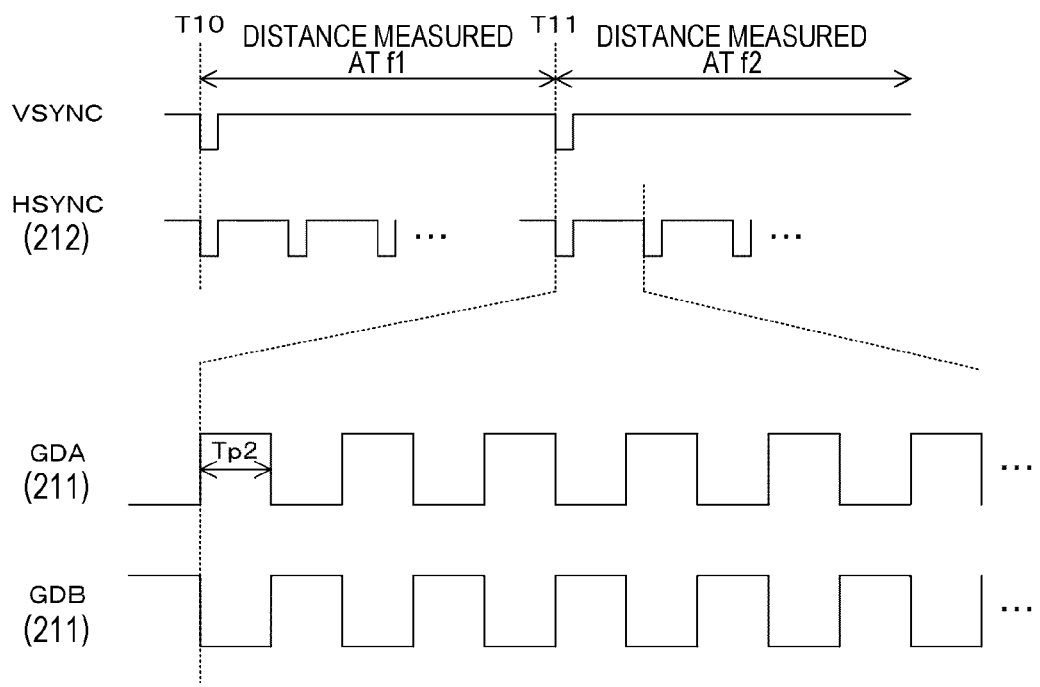

FIG. 10 is a timing chart according to the first embodiment of the present technology, showing an example operation of the light reception unit 200. In the drawing, a is a timing chart showing an example operation of the light reception unit 200 where the frequency f1 is set. In the drawing, b is a timing chart showing an example operation of the light reception unit 200 where the frequency f2 is set.

Over the period between the timing T10 and the timing T11 when the cycle of the vertical synchronization signal VSYNC is elapsed, the MX driver 211 in the light reception unit 200 supplies, to the A pixel 230, the drive signal GDA of a cycle 2×Tp1 according to the frequency f1. Furthermore, the MX driver 211 supplies, to the B pixel 240, the drive signal GDB, the phase of which is different from that of the drive signal GDA by 180 degrees.

Over the period between the timing T11 and a timing when the cycle of the vertical synchronization signal VSYNC is elapsed, the MX driver 211 in the light reception unit 200 supplies, to the A pixel 230, the drive signal GDA of a cycle 2×Tp2 according to the frequency f2. Furthermore, the MX driver 211 supplies, to the B pixel 240, the drive signal GDB, the phase of which is different from that of the drive signal GDA by 180 degrees.

(Example Configuration of Light Emission Unit)

Figure 11:
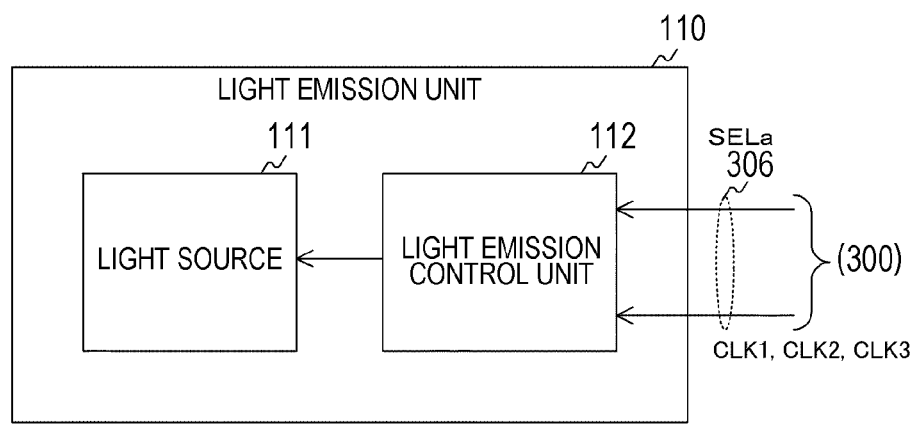
FIG. 11 is a block diagram according to the first embodiment of the present technology, showing an example configuration of a light emission unit.

FIG. 11 is a block diagram according to the first embodiment of the present technology, showing an example configuration of the light emission unit 110. The light emission unit 110 includes a light source 111 and a light emission control unit 112.

The light source 111 emits light in synchronization with a clock signal from the light emission control unit 112. As the light source 111, a laser oscillator, a light emitting diode, or the like is used.

The light emission control unit 112 drives and causes the light source 111 to emit light. The light emission control unit 112 receives the clock signals CLK1, CLK2, and CLK3, and a selection signal SELa from the control unit 300. The selection signal SELa is a signal indicating one of the clock signals CLK1, CLK2, or CLK3. The light emission control unit 112 selects one of the clock signals CLK1, CLK2, or CLK3 according to the selection signal SELa, and supplies the clock signal to the light source 111.

(Example Configuration of Control Unit)

Figure 12:
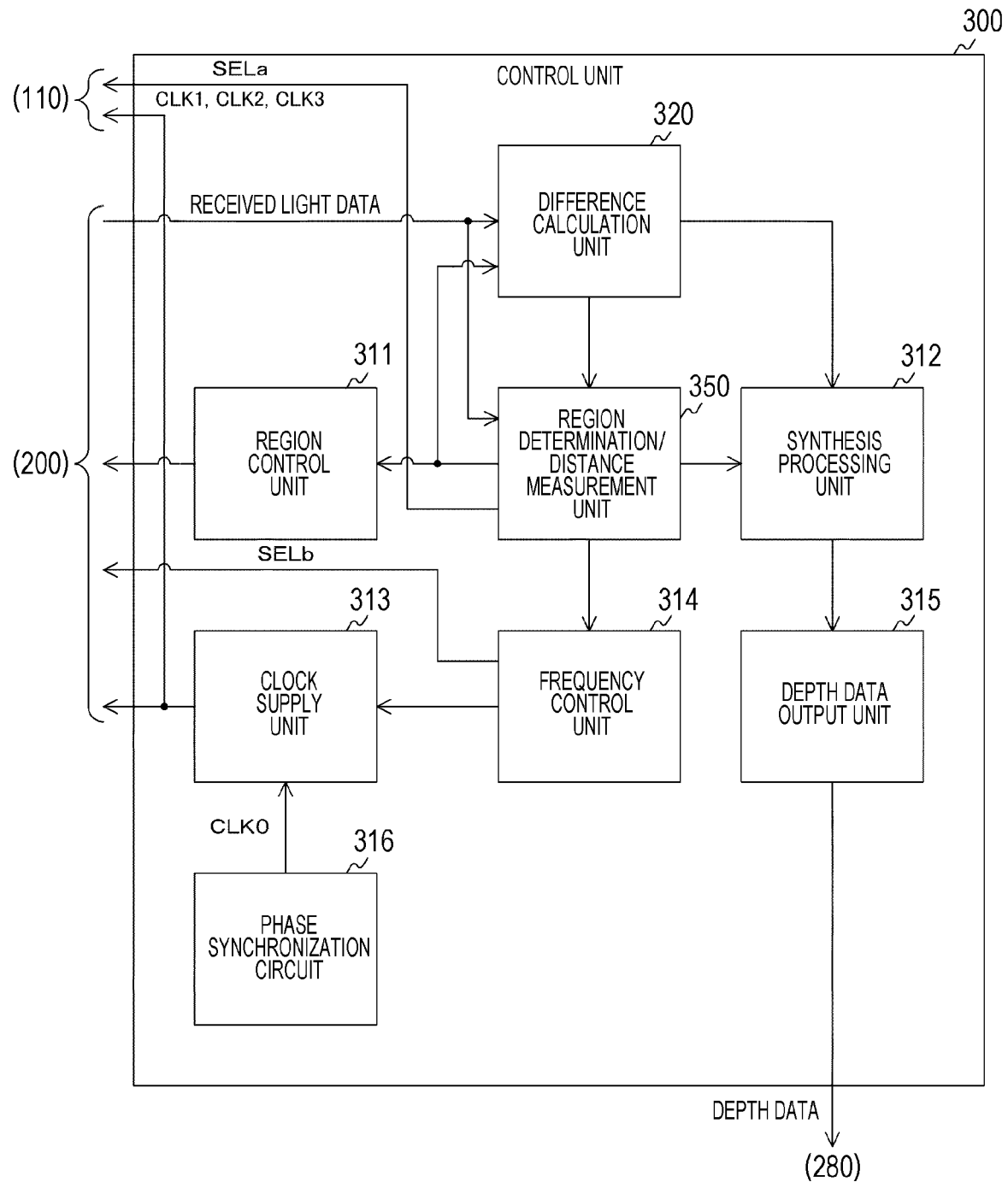
FIG. 12 is a block diagram according to the first embodiment of the present technology, showing an example configuration of a control unit.

FIG. 12 is a block diagram according to the first embodiment of the present technology, showing an example configuration of the control unit 300. The control unit 300 includes a difference calculation unit 320, a region control unit 311, a region determination/distance measurement unit 350, a synthesis processing unit 312, a clock supply unit 313, a frequency control unit 314, a depth data output unit 315, and a phase synchronization circuit 316.

The difference calculation unit 320 calculates a difference between two pieces of image data (frames) that are adjacent to each other in a chronological order. The difference calculation unit 320 supplies difference data to the region determination/distance measurement unit 350, and supplies the frames to the synthesis processing unit 312.

The region determination/distance measurement unit 350 measures a distance on the basis of the difference data, and also, determines presence or absence of an object. The region determination/distance measurement unit 350 sets the lowest frequency as f1 in an initial state, and supplies a set value to the frequency control unit 314. Then, every time a frame is supplied from the light reception unit 200, the region determination/distance measurement unit 350 determines the distance for every measurement point on the basis of every received light data in the frame. Because distance measurement is performed for each pair of pixels, in a case where the number of pixels in a frame is M×N, the distance is measured for (M×N)/2 measurement points. Then, the region determination/distance measurement unit 350 determines a statistic (such as a minimum value or an average value) of (M×N)/2 measurement values. The region determination/distance measurement unit 350 updates f1 to a frequency that is higher, the closer the statistic. Additionally, the frequency f1 does not have to be updated, and may alternatively take a fixed value.

Furthermore, the region determination/distance measurement unit 350 determines presence or absence of an object (such as a person) on the basis of the difference data in a second or later frame. In a case of determining that there is no object, the region determination/distance measurement unit 350 generates a selection signal SELa indicating the clock signal CLK1 at the frequency f1, and supplies the signal to the light emission unit 110.

On the other hand, in a case of determining that there is an object, the region determination/distance measurement unit 350 sets a region of the object as a region of interest (ROI), and sets a region, in the frame, other than the region of interest as a background region. In other words, the frame is divided into the region of interest and the background region. Furthermore, the region determination/distance measurement unit 350 sets, as f2, a frequency that is higher, the closer the statistic (such as the minimum value) of measurement values in the region of interest, and supplies a set value to the frequency control unit 314. Then, the region determination/distance measurement unit 350 alternately indicates the clock signals CLK1 and CLK2 by the selection signals SELa, in synchronization with the vertical synchronization signal VSYNC. Furthermore, the region determination/distance measurement unit 350 supplies a column address in the region of interest to the difference calculation unit 320 and the region control unit 311, and causes the difference calculation unit 320 to generate difference data regarding the region of interest. Furthermore, the region determination/distance measurement unit 350 instructs the synthesis processing unit 312 to synthesize images.

Then, when the difference data for the region of interest is received, the region determination/distance measurement unit 350 determines presence or absence of a specific part (such as a hand) of the object, on the basis of the difference data. Here, presence or absence of a hand refers to whether or not a part, of a human hand, extending from a wrist is included in image data. In a case where present of a hand is determined, the region determination/distance measurement unit 350 sets a region of the hand as a hand region, and sets a region obtained by excluding the hand region from the region of interest as a new region of interest. In other words, a part of the region of interest is separated as the hand region. Furthermore, the region determination/distance measurement unit 350 sets, as f3, a frequency that is higher, the closer the statistic (such as the minimum value) of measurement values in the hand region, and supplies a set value to the frequency control unit 314.

Then, the region determination/distance measurement unit 350 sequentially indicates the clock signals CLK1, CLK2, and CLK3 by the selection signals SELa, in synchronization with the vertical synchronization signal VSYNC. Furthermore, the region determination/distance measurement unit 350 supplies column addresses of the new region of interest and the hand region to the difference calculation unit 320 and the region control unit 311, and instructs the synthesis processing unit 312 to synthesize images.

The region control unit 311 controls the MX driver 211 in the light reception unit 200. In a case where a region of interest is not set, the region control unit 311 generates region information instructing driving of all the columns, and supplies the region information to the MX driver 211. Reflected light is thereby received by all the pixels in a frame.

In a case where a region of interest is set, the region control unit 311 alternately supplies, to the MX driver 211, region information for driving only the background region and region information for driving only the region of interest. Switching of the region information is performed at every cycle of the vertical synchronization signal VSYNC. Image data of reflected light received from the background region and image data of reflected light received from the region of interest are thereby alternately generated. These pieces of image data will be hereinafter referred to as "subframe(s)".

Then, in a case where a hand region is set, the region control unit 311 sequentially supplies, to the MX driver 211, region information for driving only the background region, region information for driving only the region of interest, and region information for driving only the hand region. Switching of the region information is performed at every cycle of the vertical synchronization signal VSYNC. Image data of reflected light received from the background region, image data of reflected light received from the region of interest, and image data of reflected light received from the hand region are thereby sequentially generated. The image data corresponding to the hand region will also be referred to below as "subframe".

Additionally, the region determination/distance measurement unit 350 determines presence or absence with respect to both the region of interest and the hand region, but the region determination/distance measurement unit 350 may also be configured to perform determination of presence or absence of only the region of interest, and to not perform determination of presence or absence of the hand region. Furthermore, the region determination/distance measurement unit 350 sets the region of interest and the hand region in units of columns using column addresses, but such a configuration is not restrictive. For example, the region determination/distance measurement unit 350 may set each of the regions in units of pixels using row addresses and column addresses. In such a case, it is sufficient if the light reception unit 200 includes an MX driver that performs driving in units of rows, in addition to the MX driver 211 that performs driving in units of columns.

The frequency control unit 314 controls the frequency of a clock signal that is supplied by the clock supply unit 313, on the basis of a set value from the region determination/distance measurement unit 350. Furthermore, the frequency control unit 314 generates a signal similar to the selection signal SELa, and supplies the signal to the light reception unit 200 as SELb.

The phase synchronization circuit 316 multiplies a reference clock signal from a crystal oscillator or the like. The phase synchronization circuit 316 supplies a multiplied clock signal CLK0 to the clock supply unit 313.

The clock supply unit 313 generates the clock signals CLK1, CLK2, and CLK3 on the basis of the clock signal CLK0 from the phase synchronization circuit 316. For example, the clock signals CLK1, CLK2, and CLK3 are generated by frequency division of the clock signal CLK0. The clock supply unit 313 supplies the generated clock signals CLK1, CLK2, and CLK3 to the light reception unit 200 and the light emission unit 110.

The synthesis processing unit 312 generates depth data by synthesizing a plurality of subframes. In a case where synthesis is not instructed by the region determination/distance measurement unit 350, the synthesis processing unit 312 generates the depth data for each frame, and supplies the depth data to the depth data output unit 315. A dynamic range of distance measurement in the depth data may be increased by synthesizing subframes with different measurable distances.

On the other hand, in a case where synthesis is instructed by the region determination/distance measurement unit 350, the synthesis processing unit 312 generates a synthesized frame by synthesizing two or three subframes. In a case where only a subframe of the region of interest and a subframe of the background region are generated, the synthesis processing unit 312 synthesizes the two subframes. Furthermore, in a case where a subframe of the region of interest, a subframe of the background region, and a subframe of the hand region are generated, the synthesis processing unit 312 synthesizes the three subframes. Then, the synthesis processing unit 312 generates the depth data from the synthesized frame obtained by synthesis, and supplies the depth data to the depth data output unit 315.

The depth data output unit 315 outputs the depth data from the synthesis processing unit 312 to outside.

(Example Configuration of Difference Calculation Unit)

Figure 13:
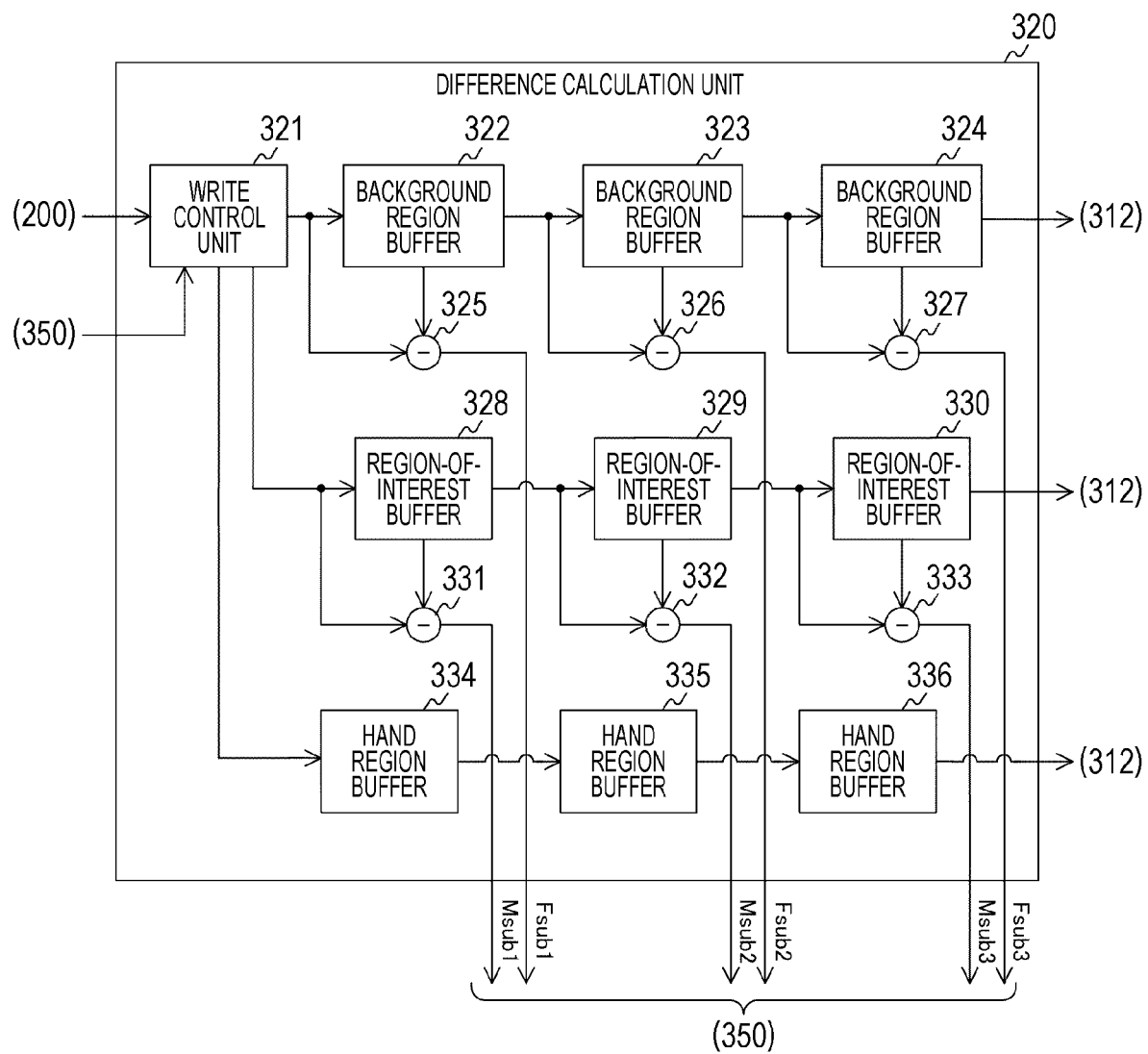
FIG. 13 is a block diagram according to the first embodiment of the present technology, showing an example configuration of a difference calculation unit.

FIG. 13 is a block diagram according to the first embodiment of the present technology, showing an example configuration of the difference calculation unit 320. The difference calculation unit 320 includes a write control unit 321, background region buffers 322, 323, and 324, and subtractors 325, 326, and 327. Furthermore, the difference calculation unit 320 includes region-of-interest buffers 328, 329, and 330, subtractors 331, 332, and 333, and hand region buffers 334, 335, and 336.

The write control unit 321 writes received light data to one of the background region buffer 322, the region-of-interest buffer 328, or the hand region buffer 334, under control of the region determination/distance measurement unit 350.

In a case where the region of interest is not set, the write control unit 321 writes all the pieces of received light data of the frame to the background region buffer 322. In a case where the region of interest is set, the write control unit 321 writes the received light data for the background region to the background region buffer 322, and writes the received light data for the region of interest to the region-of-interest buffer 328. Furthermore, in a case where the hand region is set, the write control unit 321 writes the received light data for the background region to the background region buffer 322, writes the received light data for the region of interest to the region-of-interest buffer 328, and writes the received light data for the hand region to the hand region buffer 334. Furthermore, the frame or the subframe written to the background region buffer 322 is also supplied to the subtractor 325 as a current frame.

The background region buffer 322 holds the frame or the subframe of the background region as a past frame, and also, outputs the past frame to the subtractor 325 and the background region buffer 323. The subtractor 325 calculates a difference between the current frame from the write control unit 321 and the past frame from the background region buffer 322 on a per-pixel basis. The subtractor 325 supplies difference data to the region determination/distance measurement unit 350 as Fsub1.

The background region buffer 323 holds the past frame from the background region buffer 322, and also, outputs the past frame to the subtractor 326 and the background region buffer 324. The subtractor 326 calculates a difference between the past frame from the background region buffer 322 and the past frame from the background region buffer 323 on a per-pixel basis. The subtractor 326 supplies difference data to the region determination/distance measurement unit 350 as Fsub2.

The background region buffer 324 holds the past frame from the background region buffer 323, and also, outputs the past frame to the subtractor 327 and the synthesis processing unit 312. The subtractor 327 calculates a difference between the past frame from the background region buffer 323 and the past frame from the background region buffer 324 on a per-pixel basis. The subtractor 327 supplies difference data to the region determination/distance measurement unit 350 as Fsub3.

Configurations of the region-of-interest buffers 328, 329, and 330 are similar to those of the background region buffers 322, 323, and 324 except that the region-of-interest buffers 328, 329, and 330 hold subframes of the region of interest instead of those of the background region. Furthermore, configuration of the subtractors 331, 332, and 333 are similar to those of the subtractors 325, 326, and 327 except that the subtractors 331, 332, and 333 determine differences among subframes of the region of interest instead of those of the background region. The subtractors 331, 332, and 333 supply pieces of difference data to the region determination/distance measurement unit 350 as Msub1, Msub2, and Msub3, respectively.

The hand region buffers 334, 335, and 336 are similar to the background region buffers 322, 323, and 324 except that the hand region buffers 334, 335, and 336 hold subframes of the hand region instead of those of the background region.

Additionally, the difference calculation unit 320 calculates three pieces of difference data for each of the background region and the region of interest, but the number of pieces of difference data is not limited to three, and may be other than three, such as only one or four or more. Furthermore, the difference calculation unit 320 calculates the difference data for the region of interest, but in a case of a configuration where presence or absence of the hand region is not to be determined, calculation of the difference data for the region of interest is not necessary.

(Example Configuration of Region Determination/Distance Measurement Unit)

Figure 14:
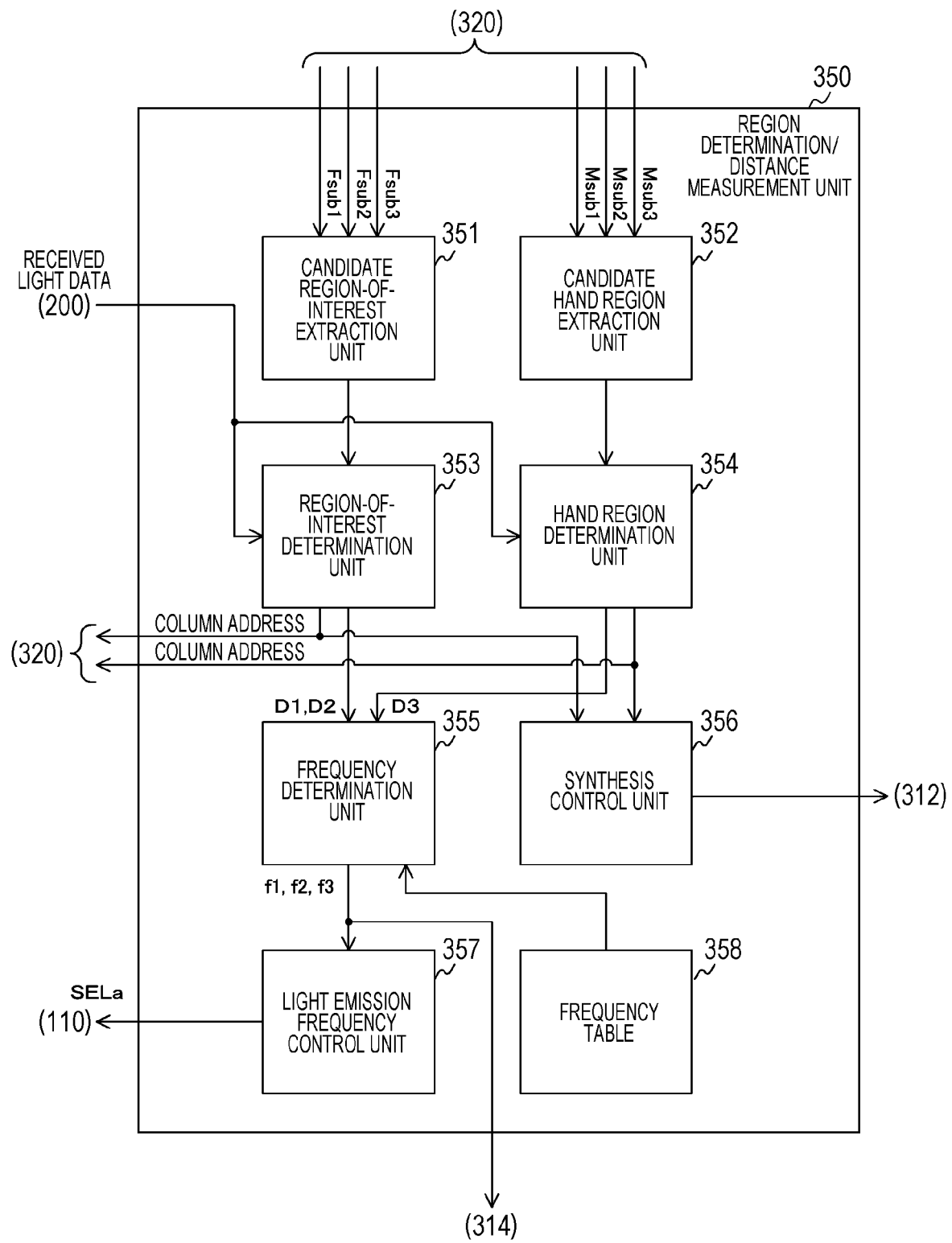
FIG. 14 is a block diagram according to the first embodiment of the present technology, showing an example configuration of a region determination/distance measurement unit.

FIG. 14 is a block diagram according to the first embodiment of the present technology, showing an example configuration of the region determination/distance measurement unit 350. The region determination/distance measurement unit 350 includes a candidate region-of-interest extraction unit 351, a candidate hand region extraction unit 352, a region-of-interest determination unit 353, a hand region determination unit 354, a frequency determination unit 355, a synthesis control unit 356, a light emission frequency control unit 357, and a frequency table 358.

The candidate region-of-interest extraction unit 351 extracts a candidate region for a region of a predetermined object (that is, a region of interest) on the basis of the difference data Fsub1, Fsub2, and Fsub3 for the background region. The candidate region-of-interest extraction unit 351 determines a weighted average of the difference data Fsub1, Fsub2, and Fsub3, for example. Then, the candidate region-of-interest extraction unit 351 compares the weighted average against a predetermined threshold S. The candidate region-of-interest extraction unit 351 processes all the pixels in the background region in a similar manner, and extracts a region including columns including pixels with greater weighted averages than the threshold S as the candidate region for the region of interest. The candidate region-ofinterest extraction unit 351 supplies each column address in the candidate region to the region-of-interest determination unit 353.

The candidate hand region extraction unit 352 extracts a candidate region for the hand region on the basis of the difference data Msub1, Msub2, and Msub3 for the region of interest. The candidate hand region extraction unit 352 extracts the candidate region for the hand region by a process similar to that of the candidate region-of-interest extraction unit 351, and supplies each column address in the candidate region to the hand region determination unit 354.

The region-of-interest determination unit 353 determines presence or absence of a region of interest in the background region. The region-of-interest determination unit 353 determines a distance to each measurement point in the candidate region by Formulae 1 and 2, on the basis of the received light data from the light reception unit 200. Then, the region-of-interest determination unit 353 determines whether or not a minimum value of the distances is smaller than a predetermined threshold Df. If the minimum value is smaller than the predetermined threshold Df, the region-of-interest determination unit 353 determines that there is a region of interest, and sets the candidate region as the region of interest. On the other hand, if the minimum value is equal to or greater than the predetermined threshold Df, the region-of-interest determination unit 353 determines that there is no region of interest.

In a case where there is no region of interest, the region-of-interest determination unit 353 supplies, to the frequency determination unit 355, a statistic (such as an average value) of the distances in the frame as D1. On the other hand, in a case where there is a region of interest, the region-of-interest determination unit 353 supplies each column address in the region of interest to the region control unit 311, the difference calculation unit 320, and the synthesis control unit 356.

Furthermore, the region-of-interest determination unit 353 supplies, to the frequency determination unit 355, a statistic of the distances in the background region as D1, together with a statistic D2 of the distances in the region of interest.

The hand region determination unit 354 determines presence or absence of a hand region in the region of interest. The hand region determination unit 354 determines whether or not the minimum value of distances in the candidate region is smaller than a predetermined threshold Dn, on the basis of the received light data. Here, a value smaller than the threshold Df is set as the threshold Dn. If the minimum value is smaller than the threshold Dn, the hand region determination unit 354 determines that there is a hand region, and sets the candidate region as the hand region. On the other hand, if the minimum value is equal to or greater than the predetermined threshold Dn, the hand region determination unit 354 determines that there is no hand region. Additionally, a circuit including the region-of-interest determination unit 353 and the hand region determination unit 354 is an example of a determination unit described in the claims.

In a case where there is a hand region, the hand region determination unit 354 supplies each column address in the hand region to the region control unit 311, the difference calculation unit 320, and the synthesis control unit 356. Furthermore, the hand region determination unit 354 supplies, to the frequency determination unit 355, a statistic (such as an average value) of the distances in the hand region as D3.

The frequency table 358 is a table associating a frequency to be set in the light emission unit 110 and the light reception unit 200 with each of a plurality of mutually different distance ranges.

The frequency determination unit 355 determines the frequency to be set in the light emission unit 110 and the light reception unit 200, on the basis of the statistics D, D2, and D3. The frequency determination unit 355 reads out a frequency corresponding to the distance range including the statistic D1 from the frequency table 358, sets the frequency as the frequency f1 to be used at the time of performing distance measurement with respect to the background region, and supplies the frequency to the light emission frequency control unit 357 and the frequency control unit 314. Furthermore, the frequency determination unit 355 reads out a frequency corresponding to the distance range including the statistic D2 from the frequency table 358, sets the frequency as the frequency f2 to be used at the time of performing distance measurement with respect to the region of interest, and supplies the frequency to the light emission frequency control unit 357 and the frequency control unit 314. Furthermore, the frequency determination unit 355 reads out a frequency corresponding to the distance range including the statistic D3 from the frequency table 358, sets the frequency as the frequency f3 to be used at the time of performing distance measurement with respect to the hand region, and supplies the frequency to the light emission frequency control unit 357 and the frequency control unit 314. Additionally, the frequency determination unit 355 is an example of a setting unit described in the claims.

The synthesis control unit 356 controls the synthesis processing unit 312 on the basis of determination results from the region-of-interest determination unit 353 and the hand region determination unit 354. In a case where presence of a region of interest is determined, the synthesis control unit 356 instructs the synthesis processing unit 312 to synthesize the subframe of the background region and the subframe of the region of interest. Furthermore, in a case where presence of a hand region is determined, the synthesis control unit 356 instructs the synthesis processing unit 312 to synthesize the subframe of the background region, the subframe of the region of interest, and the subframe of the hand region.

The light emission frequency control unit 357 controls the light emission frequency of the light emission unit 110. In a case where only the frequency f1 corresponding to the background region is set, the light emission frequency control unit 357 causes, by the SELa, the light emission unit 110 to select the clock signal CLK1 at the frequency f1. Furthermore, in a case where the frequency f2 corresponding to the region of interest is set, the light emission frequency control unit 357 causes, by the SELa, the clock signals CLK1 and CLK2 corresponding to the frequencies f1 and f2 to be alternately selected.

Furthermore, in a case where the frequency f3 corresponding to the hand region is set, the light emission frequency control unit 357 causes, by the SELa, the clock signals CLK1, CLK2, and CLK3 corresponding to the frequencies f1, f2, and f3 to be sequentially selected.

Additionally, the region-of-interest determination unit 353 and the hand region determination unit 354 determine presence or absence of a specific object or part on the basis of a difference between frames (or subframes), but such a configuration is not restrictive. For example, the region-of-interest determination unit 353 and the hand region determination unit 354 may also determine presence or absence of a specific object or part using a pattern matching algorithm.

FIG. 15 is a diagram according to the first embodiment of the present technology, showing an example of the frequency table 358. In the frequency table 358, a frequency to be set in the light emission unit 110 and the light reception unit 200 are indicated for each distance range. Furthermore, a higher frequency is indicated, the smaller the distance. For example, in a case where the distance range is smaller than Dth1, a highest frequency fm1 is set. Furthermore, in a case where the distance range is equal to or greater than Dth1 and smaller than Dth2, a frequency fm2 that is highest next to the frequency fm1 is set.

Additionally, the frequency determination unit 355 determines the frequencies f1 to f3 by reading out frequencies corresponding to the statistics D1 to D3 from the frequency table 358, but such a configuration is not restrictive. For example, the frequency determination unit 355 may calculate the frequencies f1 to f3 by using a predetermined function that returns a frequency that is higher, the smaller the distance.

Figure 16:
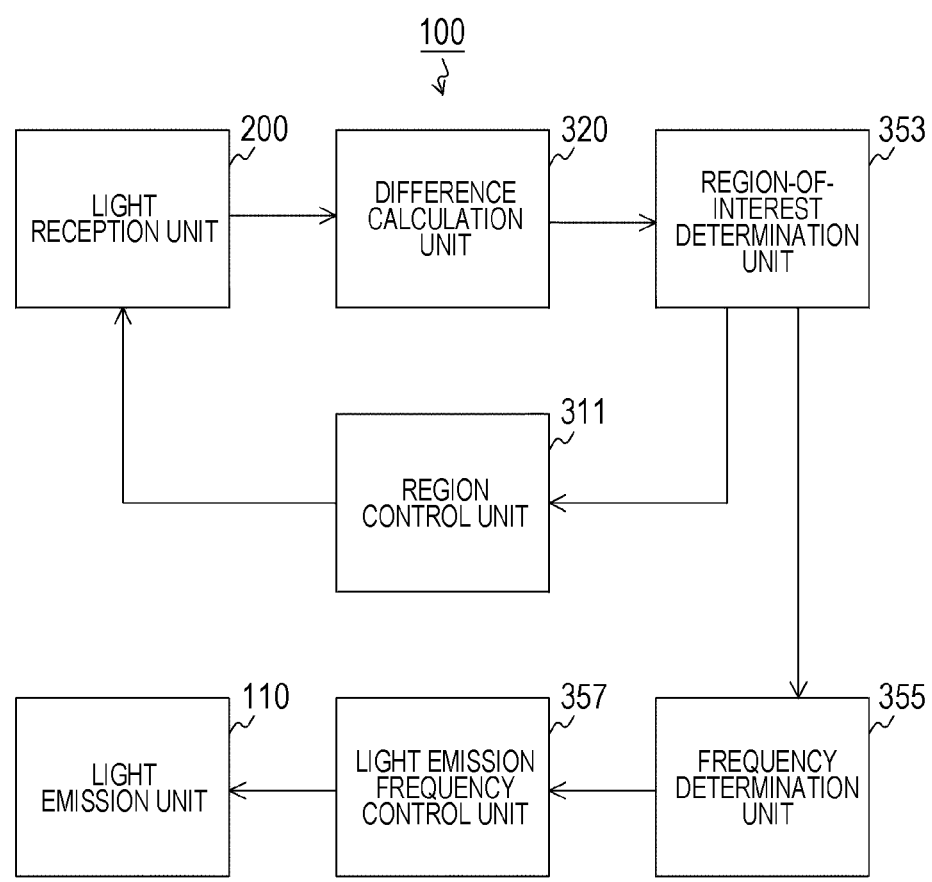
FIG. 16 is a block diagram according to the first embodiment of the present technology, showing a simplified example configuration of the electronic device 100.

FIG. 16 is a block diagram according to the first embodiment of the present technology, showing a simplified example configuration of the electronic device 100. The electronic device 100 includes the light reception unit 200, the difference calculation unit 320, the region-of-interest determination unit 353, the region control unit 311, the frequency determination unit 355, the light emission frequency control unit 357, and the light emission unit 110. The synthesis processing unit 312, the clock supply unit 313, and the like are omitted in the drawing.

In an initial state, the light emission unit 110 radiates radiation light in synchronization with a clock signal at a predetermined frequency f1, and the light reception unit 200 receives reflected light of the radiation light, and generates received light data. Then, the light reception unit 200 generates image data (frame) including the received light data in synchronization with the vertical synchronization signal VSYNC, and supplies the image data to the difference calculation unit 320.

The difference calculation unit 320 calculates difference data between frames, and supplies the difference data to the region-of-interest determination unit 353. Then, the region-of-interest determination unit 353 determines presence or absence of a region of an object (region of interest) on the basis of the difference data. In a case where there is a region of interest, the region-of-interest determination unit 353 supplies the column address in the region to the region control unit 311, and supplies a statistic (such as an average value) of distances in the region of interest to the frequency determination unit 355.

Furthermore, in case where presence of a region of interest is determined, the region control unit 311 alternately performs control of causing the light reception unit 200 to read out only the background region other than the region of interest and control of causing the light reception unit 200 to read out only the region of interest.

The frequency determination unit 355 determines a frequency f2 that is higher, the closer the statistic of distances to the object, and supplies the frequency to the light emission frequency control unit 357. The light emission frequency control unit 357 alternately sets the frequencies f1 and f2 as the light emission frequency of the light emission unit 110.

Here, a comparative example of performing distance measurement at the frequency f1 regardless of presence or absence of an object will be considered. As described above, there is a trade-off relationship between the measurable distance and the distance measurement accuracy, and thus, if the frequency f1 is too high, distance measurement cannot be performed for a faraway object, and if the frequency f1 is too low, the distance measurement accuracy is reduced. Because the distance to an object is not known at the time of start of distance measurement, an appropriate frequency is difficult to set in the comparative example.

On the other hand, with the electronic device 100, distance measurement is first performed at the frequency f1, and in a case where presence of an object is determined, switching to the frequency f2 that is higher, the smaller the distance to the object is performed, and thus, an optimal frequency according to the distance to the object may be set.

Figure 17:
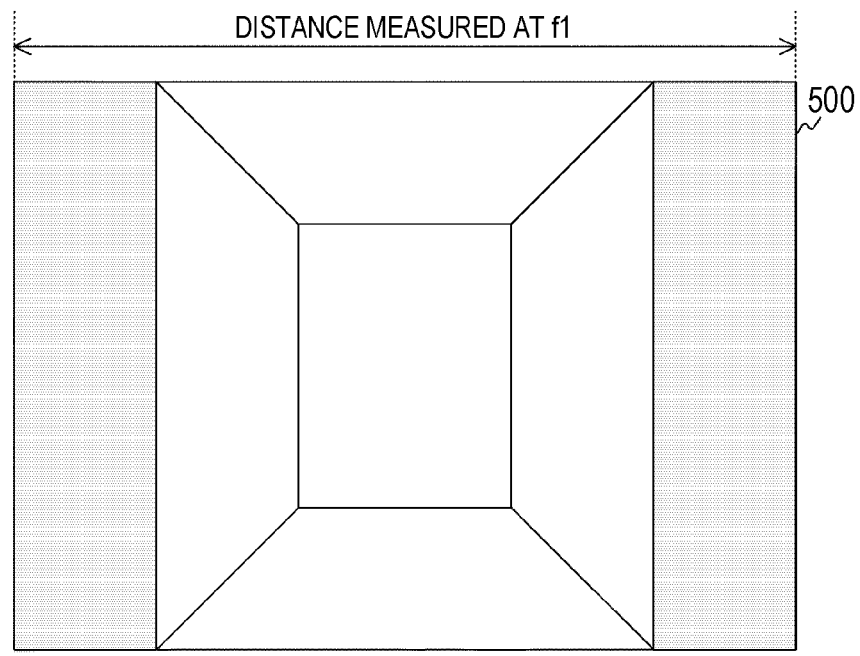
FIG. 17 is a diagram according to the first embodiment of the present technology, showing an example of image data.
Figure 17:
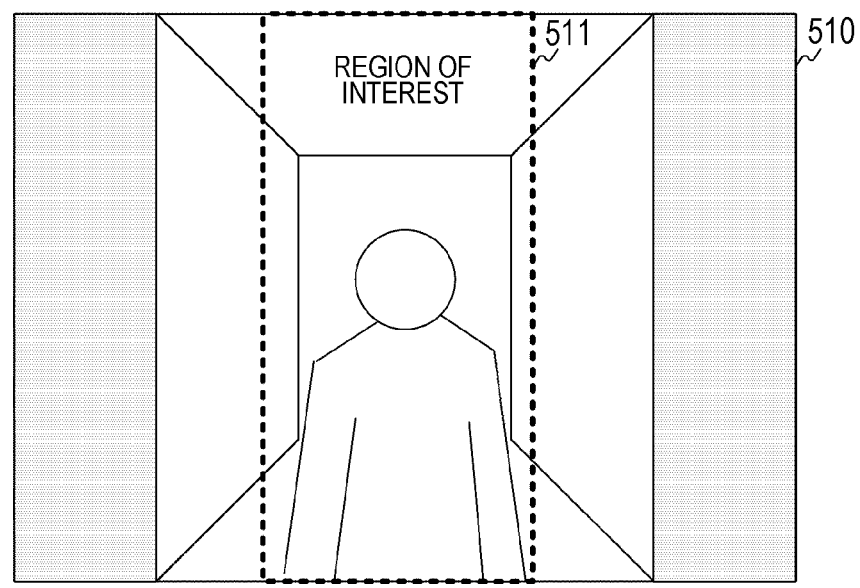

FIG. 17 is a diagram according to the first embodiment of the present technology, showing an example of image data. In the drawing, a is a diagram showing an example of image data 500 where absence of an object is determined, and b in the drawing is a diagram showing an example of image data 510 where presence of an object is determined.

The electronic device 100 receives reflected light at the frequency f1, generates the image data 500 (frame), and performs distance measurement. The electronic device 100 repeats generation of the image data and distance measurement in synchronization with the vertical synchronization signal VSYNC, and in second and later frames, determines presence or absence of an object (such as a person) on the basis of the difference data. Then, if presence of an object is determined in the image data 510, the electronic device 100 sets the region as a region of interest 511, and sets the rest as the background region.

Figure 18:
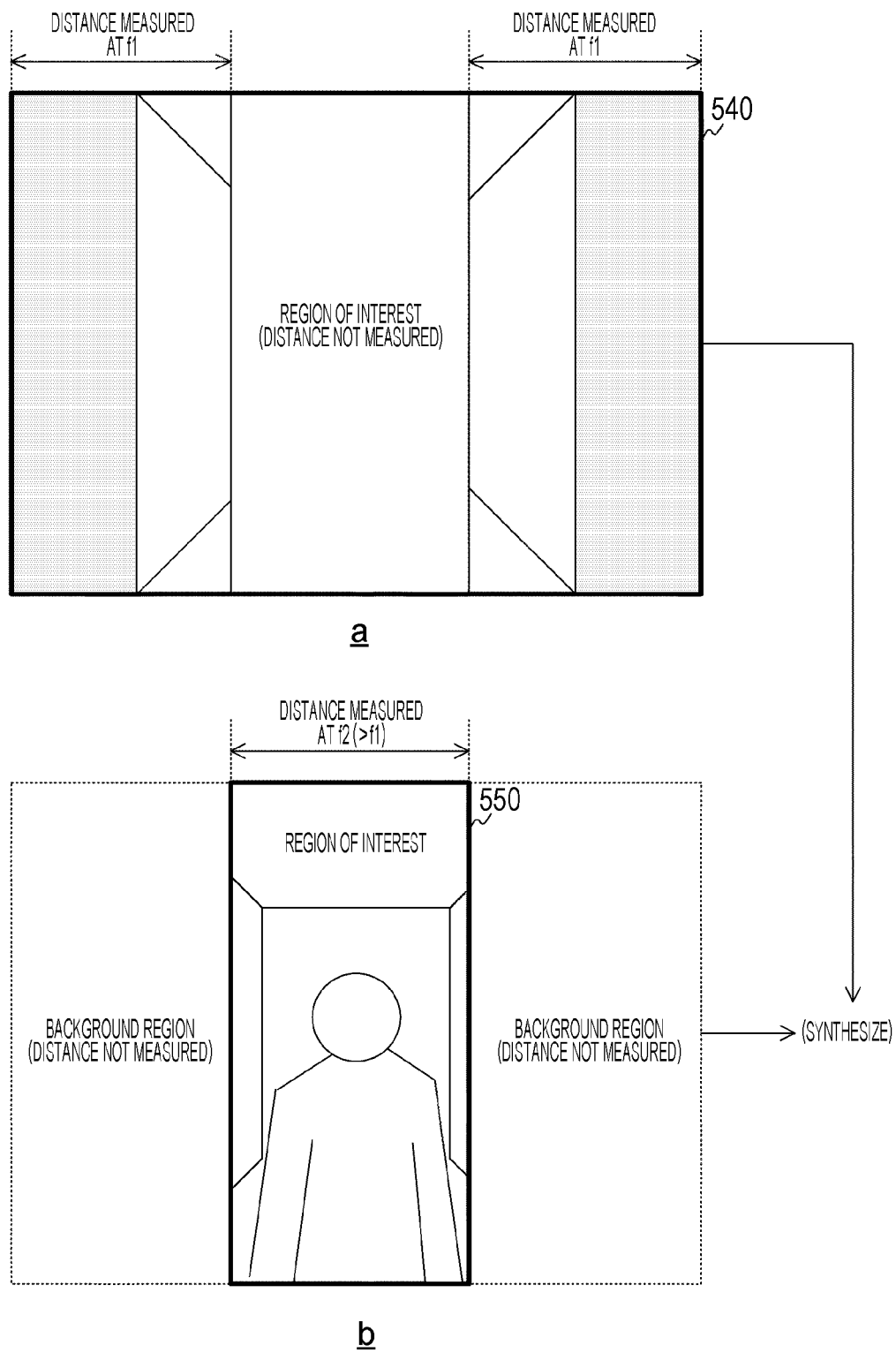
FIG. 18 is a diagram according to the first embodiment of the present technology, showing an example of a subframe after a region of interest is set.

FIG. 18 is a diagram according to the first embodiment of the present technology, showing an example of a subframe after a region of interest is set. In the drawing, a is an example of a subframe 540 of the background region, and b in the drawing is an example of a subframe 550 of the region of interest. The MX driver 211 in the electronic device 100 drives only the pixels in the background region, and the pixels receive light in synchronization with the clock signal CLK1 at the frequency f1. The subframe 540 of the background region is thereby generated. Then, the MX driver 211 drives only the pixels in the region of interest in the next cycle of the vertical synchronization signal, and the pixels receive light in synchronization with the clock signal CLK2 at the frequency f2 that is higher, the smaller the distance to the object. The subframe 550 of the region of interest is thereby generated. Thereafter, the subframe of the background region and the subframe of the region of interest are alternately generated in synchronization with the vertical synchronization signal.

Then, the control unit 300 in the electronic device 100 generates one synthesized frame by synthesizing the subframe 540 of the background region and the subframe 550 of the region of interest, and generates depth data from the synthesized frame. Because two pieces are synthesized, a frame rate of the synthesized frame is half the frame rate of a case where synthesis is not performed.

As described above, light is received, with respect to the background region, in synchronization with the clock signal CLK1 at the frequency f1, and light is received, with respect to the region of interest, in synchronization with the clock signal CLK1 at the frequency f2 that is higher, the smaller the distance to the object. Normally, an object is on a closer side than the background, and a higher value is set for the frequency f2 than for the frequency f1.

Then, because a lower frequency means smaller power consumption, although the distance measurement accuracy is also reduced, the lower frequency f1 is set for the background region where accuracy is generally not much required, and the power consumption may be reduced compared to a case of constantly setting the frequency f2. Furthermore, because the distance measurement accuracy is more increased, the higher the frequency, the high frequency f2 is set for an object, such as a person, that generally requires high accuracy, to satisfy such a requirement. In this manner, the electronic device 100 may achieve both the distance measurement accuracy and reduction in the power consumption by setting optimal frequencies for the background and the object, respectively.

Figure 19:
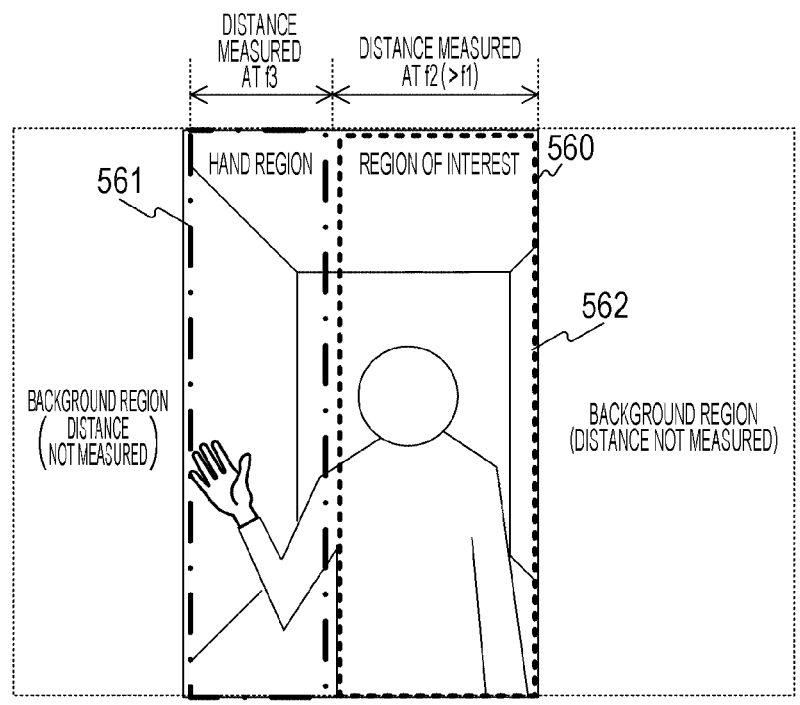
FIG. 19 is a diagram according to the first embodiment of the present technology, showing an example of the subframe of the region of interest where a hand region is set.

FIG. 19 is a diagram according to the first embodiment of the present technology, showing an example of a subframe 560 of the region of interest where a hand region is set. When presence of a region of a hand is determined in the subframe 560, the electronic device 100 sets the region as a hand region 561, and sets the remaining region as a new region of interest 562. A frequency f3 that is higher, the smaller the distance to the hand is set for the hand region 561.

Here, the threshold Dn used at the time of determining presence or absence of a hand region is smaller than the threshold Df used at the time of determining presence or absence of a background region, and thus, the distance to the hand region is smaller than the distance to the background region. Accordingly, a higher value is set for the frequency f3 corresponding to the hand region than for the frequency f2 corresponding to the region of interest. Accordingly, the electronic device 100 may perform distance measurement for the hand region with the highest accuracy. Recognition accuracy for gesture recognition may thus be increased.

(Example Operation of Electronic Device)

Figure 20:
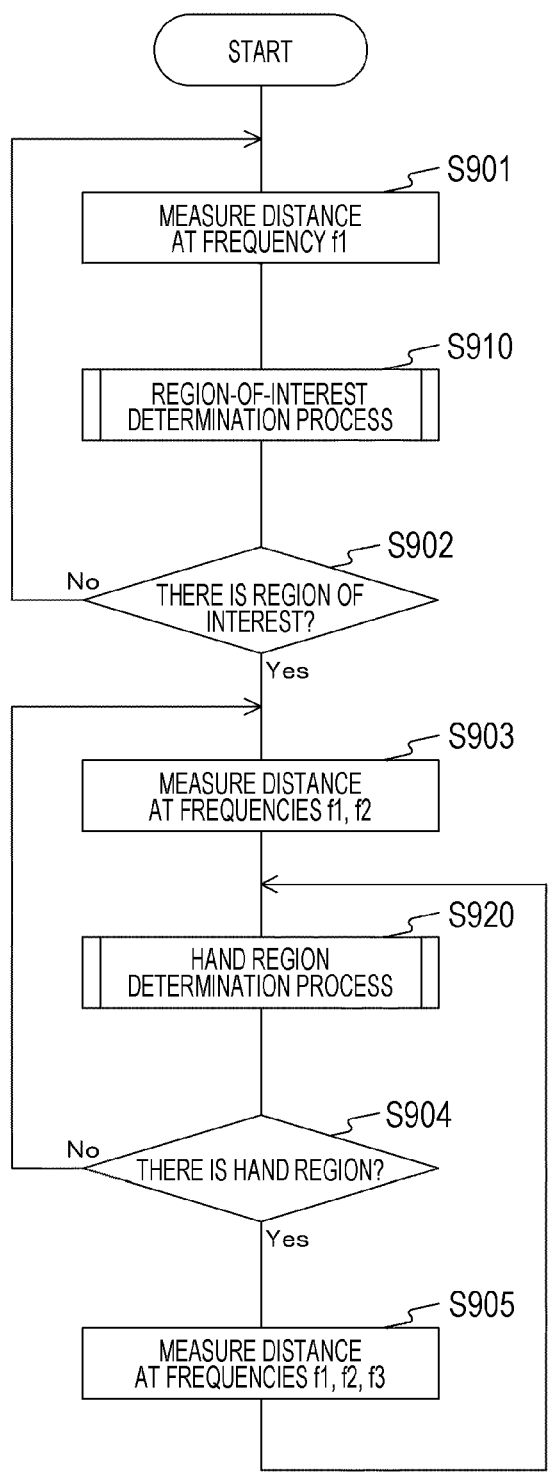
FIG. 20 is a flowchart according to the first embodiment of the present technology, showing an example operation of the electronic device.

FIG. 20 is a flowchart according to the first embodiment of the present technology, showing an example operation of the electronic device 100. The operation is started when a predetermined application that uses the depth data is executed, for example.

The electronic device 100 emits light in synchronization with the clock signal CLK1 at the frequency f1, receives reflected light, and performs distance measurement (step S901). Then, the electronic device 100 performs a region-of-interest determination process of determining presence or absence of a region of interest (step S910).

The electronic device 100 determines whether or not presence of a region of interest is determined in step S910 (step S902). In a case where absence of a region of interest is determined (step S902: No), the electronic device 100 repeats from step S901.

On the other hand, in a case where presence of a region of interest is determined (step S902: Yes), the electronic device 100 determines the frequency f2 that is higher, the smaller the distance to the object, and performs distance measurement by alternately setting the frequencies f1 and f2 (step S903). Then, the electronic device 100 performs a hand region determination process of determining presence or absence of a hand region (step S920).

The electronic device 100 determines whether or not presence of a hand region is determined in step S920 (step S904). In a case where absence of a hand region is determined (step S904: No), the electronic device 100 repeats from step S903.

On the other hand, in a case where presence of a hand region is determined (step S904: Yes), the electronic device 100 determines the frequency f3 that is higher, the smaller the distance to the hand, and performs distance measurement by sequentially setting the frequencies f1, f2, and f3 (step S905). After step S905, the electronic device 100 repeats from step S920.

Figure 21:
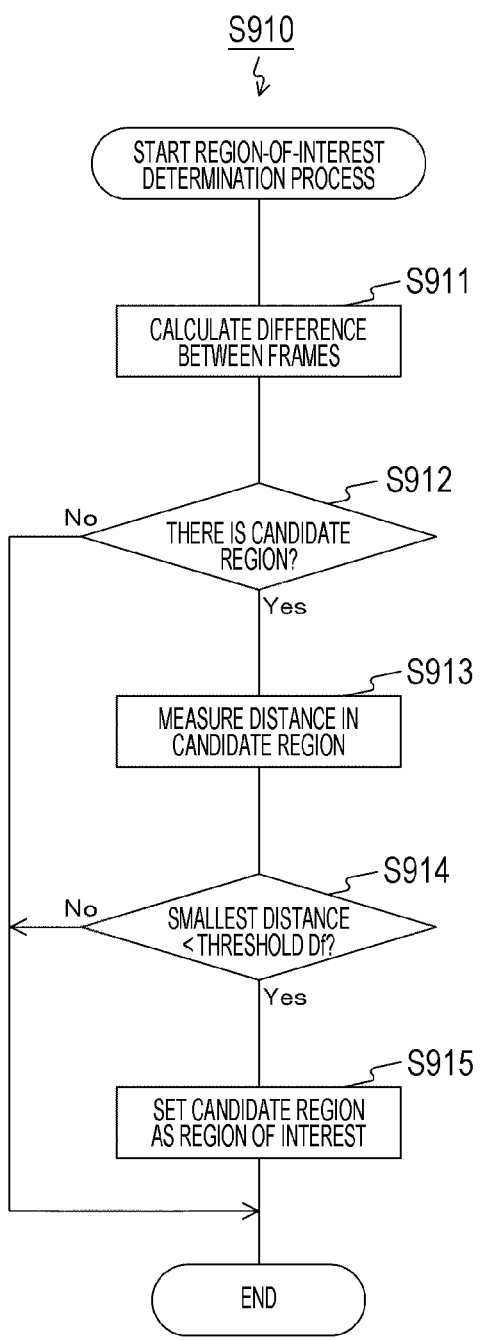
FIG. 21 is a flowchart according to the first embodiment of the present technology, showing an example operation of a region-of-interest determination process.

FIG. 21 is a flowchart according to the first embodiment of the present technology, showing an example operation of the region-of-interest determination process. The electronic device 100 calculates a difference between frames (step S911), and determines whether or not there is a candidate region for the region of interest (step S912). In a case where there is a candidate region (step S912: Yes), the electronic device 100 performs distance measurement with respect to the candidate region (step S913), and determines whether or not the smallest distance is smaller than the threshold Df (step S914).

In a case where the smallest distance is smaller than the threshold Df (step S914: Yes), the electronic device 100 determines that there is a region of interest, and sets the candidate region as the region of interest (step S915). The electronic device 100 ends the region-of-interest determination process, in a case where there is no candidate region (step S912: No), or in a case where the smallest distance is equal to or greater than the threshold Df (step S914: No), or after step S915.

Figure 22:
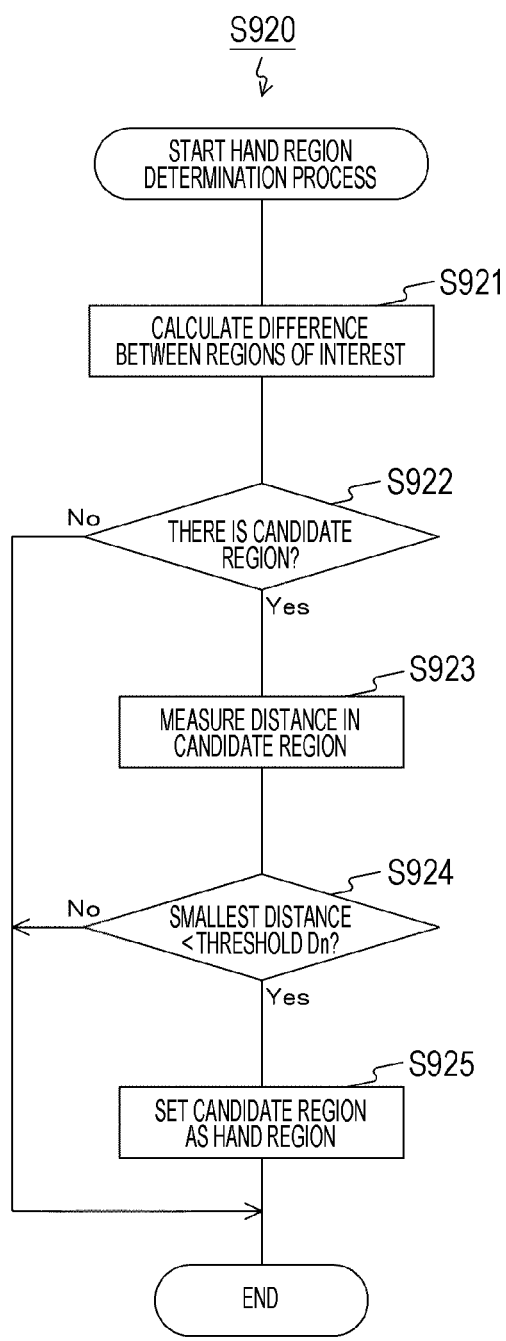
FIG. 22 is a flowchart according to the first embodiment of the present technology, showing an example operation of a hand region determination process.

FIG. 22 is a flowchart according to the first embodiment of the present technology, showing an example operation of the hand region determination process. The electronic device 100 calculates a difference between subframes of the region of interest (step S921), and determines whether or not there is a candidate region for the hand region (step S922). In a case where there is a candidate region (step S922: Yes), the electronic device 100 performs distance measurement with respect to the candidate region (step S923), and determines whether or not the smallest distance is smaller than the threshold Dn (step S924).

In a case where the smallest distance is smaller than the threshold Dn (step S924: Yes), the electronic device 100 determines that there is a hand region, and sets the candidate region as the hand region (step S925). The electronic device 100 ends the hand region determination process, in a case where there is no candidate region (step S922: No), or in a case where the smallest distance is equal to or greater than the threshold Dn (step S924: No), or after step S925.

As described above, in the first embodiment of the present technology, the control unit 300 sets, in the light emission unit 110, the frequency f2 that is higher, the smaller the distance to an object, and thus, the electronic device 100 may perform distance measurement at an appropriate frequency according to the distance to the object.

Example Modification

In the first embodiment described above, the electronic device 100 alternately generates, and synthesizes, the subframe of a background region and the subframe of a region of interest, in a case where there is a region of interest. However, because two subframes are synthesized, the frame rate of the synthesized frame is reduced to half that of a case where synthesis is not performed. Due to such reduction in the frame rate, the recognition accuracy of gesture recognition is possibly reduced in a case where an object moves greatly. The electronic device 100 of an example modification of the first embodiment is different from that in the first embodiment in that reduction in the frame rate is suppressed.

Figure 23:
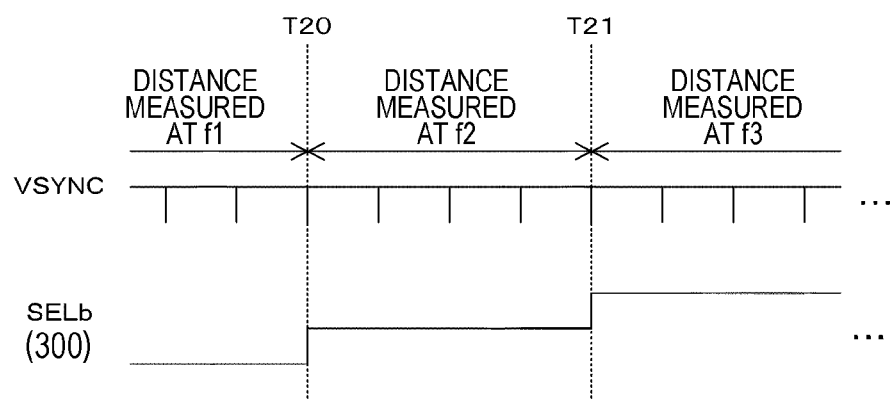
FIG. 23 is a timing chart according to a first modification of the first embodiment of the present technology, showing an example of a frequency setting operation.

FIG. 23 is a timing chart according to a first modification of the first embodiment of the present technology, showing an example of a frequency setting operation. In the example modification of the first embodiment, after a timing T20 when presence of an object is determined, the electronic device 100 sets the frequency f2, and generates only the subframe of the region of interest in synchronization with the vertical synchronization signal VSYNC. Then, the electronic device 100 synthesizes the subframe of the region of interest, and a background part of a frame held in the background region buffer 324. Because the electronic device 100 does not generate the subframe of the background region, the frame rate of the synthesized frame is the same as in a case where synthesis is not performed.

Furthermore, after a timing T21 when presence of a hand is determined, the electronic device 100 sets the frequency f3, and generates only the subframe of the hand region in synchronization with the vertical synchronization signal VSYNC. Then, the electronic device 100 synthesizes the subframe of the hand region, and parts, other than the hand region, held in the background region buffer 324 and the region-of-interest buffer 330.

Additionally, in a case where presence of a hand region is determined, the electronic device 100 may alternately generate the subframe of the hand region and the subframe of the background region, and may synthesize the subframes with a background part in the frame held in the background region buffer 324.

As described above, according to the example modification of the first embodiment of the present technology, the electronic device 100 performs synthesis using a background held in the background region buffer 324, without generating the subframe of the background, and thus, reduction in the frame rate of the synthesized frame may be suppressed.

2. Second Embodiment

In the first embodiment described above, the light reception unit 200 generates image data including the region of interest and the background region, but because there is only one optical unit, it is difficult to increase resolution of the region of interest relative to the background region. For example, to increase resolution of the region of interest, it is sufficient to provide an optical unit for the region of interest and an optical unit for the background region, and to increase a zoom magnification of the optical unit for the region of interest. The electronic device 100 of the second embodiment is different from that in the first embodiment in that the resolution of the region of interest is more increased than that of the background region.

Figure 24:
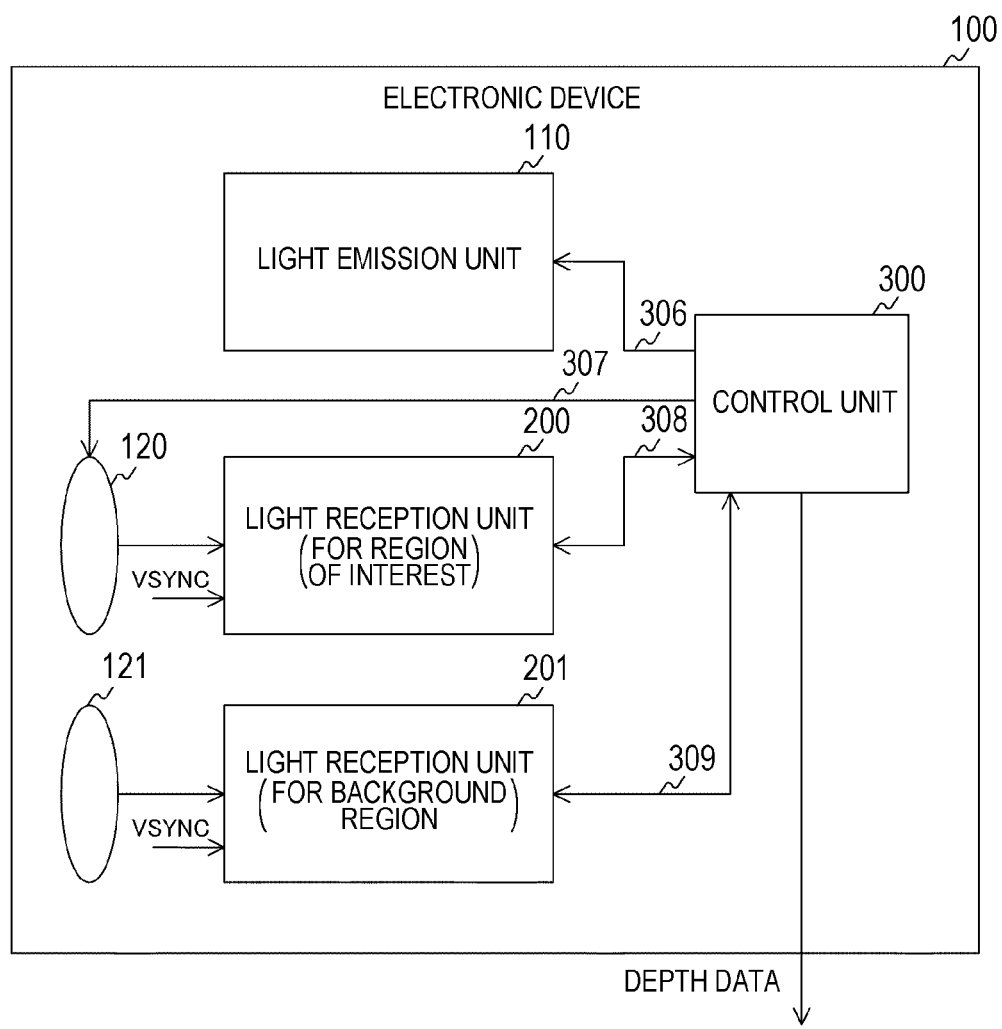
FIG. 24 is a block diagram according to a second embodiment of the present technology, showing an example configuration of an electronic device.

FIG. 24 is a block diagram according to the second embodiment of the present technology, showing an example configuration of the electronic device 100. The electronic device 100 of the second embodiment is different from that in the first embodiment in that optical units 120 and 121 and a light reception unit 201 are further included.

The optical unit 120 condenses, and guides to the light reception unit 200, reflected light from the region of interest. The optical unit 121 condenses, and guides to the light reception unit 200, reflected light from the background region. The light reception unit 200 receives the reflected light from the region of interest, and the light reception unit 201 receives the reflected light from the background region. Additionally, the optical units 120 and 121 are examples of first and second optical units described in the claims.

In an initial state, the control unit 300 drives only the light reception unit 201 to cause a frame to be generated, and acquires the frame through a signal line 309. Then, in a case where there is an object, the control unit 300 supplies a control signal to the optical unit 120 through a signal line 307, and sets a zoom magnification according to the distance to the object. Furthermore, the control unit 300 alternately performs a process of driving the light reception unit 200 to cause a frame of a region of interest to be generated, and a process of driving the light reception unit 201 to cause a frame of a background region to be generated. Moreover, in a case where presence of a hand region is determined, the control unit 300 causes the light reception unit 200 to alternately generate a subframe of the hand region and a subframe of the background region.

Figure 25:
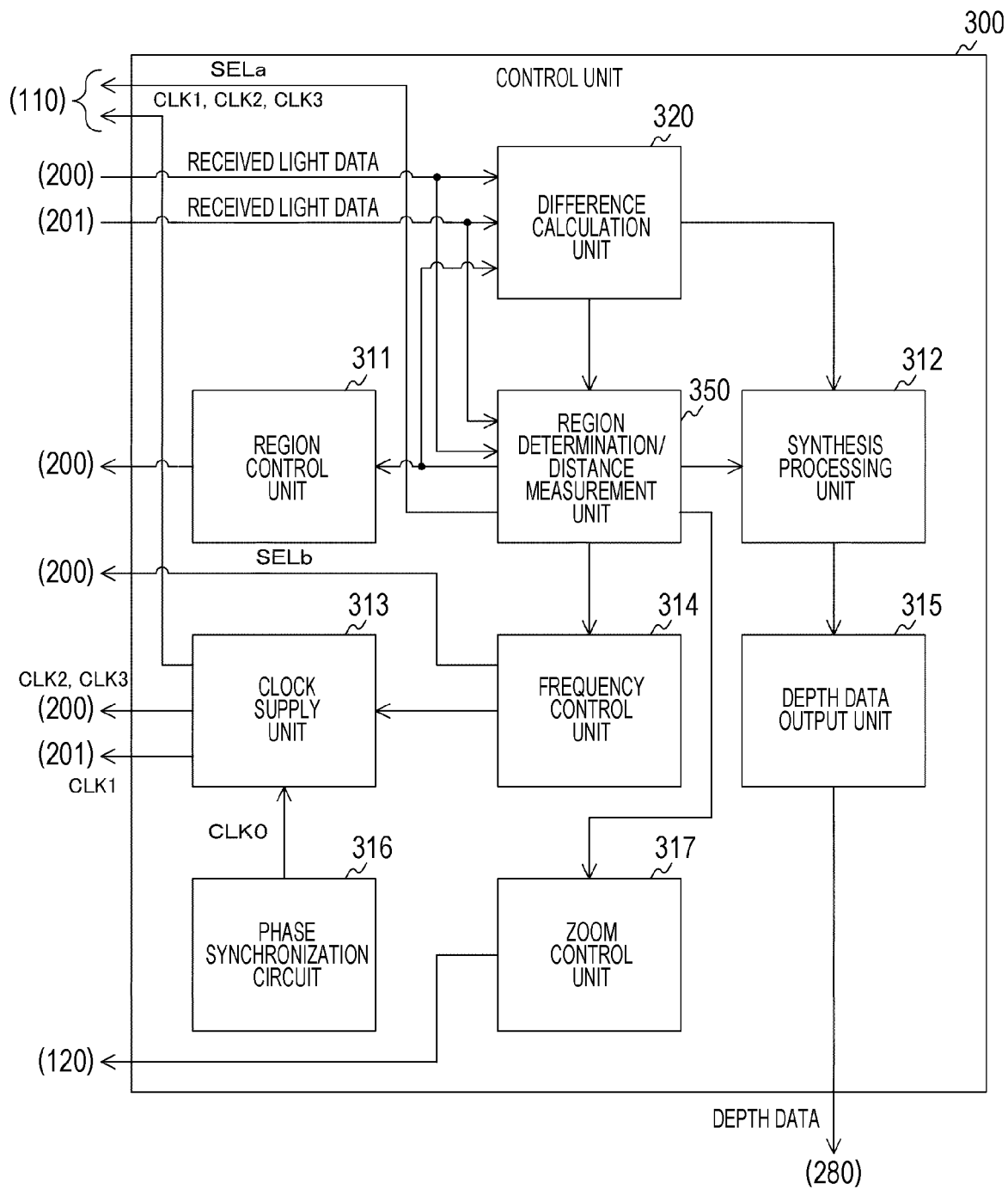
FIG. 25 is a block diagram according to the second embodiment of the present technology, showing an example configuration of a control unit.

FIG. 25 is a block diagram according to the second embodiment of the present technology, showing an example configuration of the control unit 300. The control unit 300 of the second embodiment is different from that in the first embodiment in that a zoom control unit 317 is further included.

The zoom control unit 317 receives the statistic D2 of distances in the region of interest from the region determination/distance measurement unit 350, and controls the zoom magnification of the optical unit 120 on the basis of the statistic D2. For example, the zoom control unit 317 increases the zoom magnification, the greater the statistic D2. Moreover, a higher value is set for the zoom magnification of the optical unit 120 than for the optical unit 120. Furthermore, the clock supply unit 313 supplies the clock signal CLK1 to the light reception unit 201, and supplies the clock signals CLK2 and CLK3 to the light reception unit 200. The frequency control unit 314 controls the light reception unit 200 by the selection signal SELb, and causes the light reception unit 200 to switch to one of the clock signal CLK2 or CLK3.

Additionally, the zoom control unit 317 controls the zoom magnification of only the optical unit 120, but the zoom control unit 317 may also control the zoom magnification of the optical unit 121 on the basis of the statistic D1. Furthermore, a light reception unit and an optical unit for distance measurement in a hand region may further be included. In such a case, the added optical unit condenses reflected light from the hand region, and the added optical unit receives the reflected light in synchronization with the clock signal CLK3.

As described above, in the second embodiment of the present technology, the zoom control unit 317 increases the zoom magnification of the optical unit 120 corresponding to the region of interest, and thus, the resolution of the region of interest may be more increased than that of the background region.

3. Third Embodiment

In the first embodiment described above, a subframe of a background region and a subframe of a region of interest are synthesized in a case where there is a region of interest, but because two subframes are synthesized, the frame rate of the synthesized frame is reduced to half. Furthermore, because there is only one optical unit, it is difficult to increase resolution of the region of interest relative to the background region. The electronic device 100 of a third embodiment is different from that in the first embodiment in that the resolution of the region of interest is increased relative to the background region, and that reduction in the frame rate is suppressed.

Figure 26:
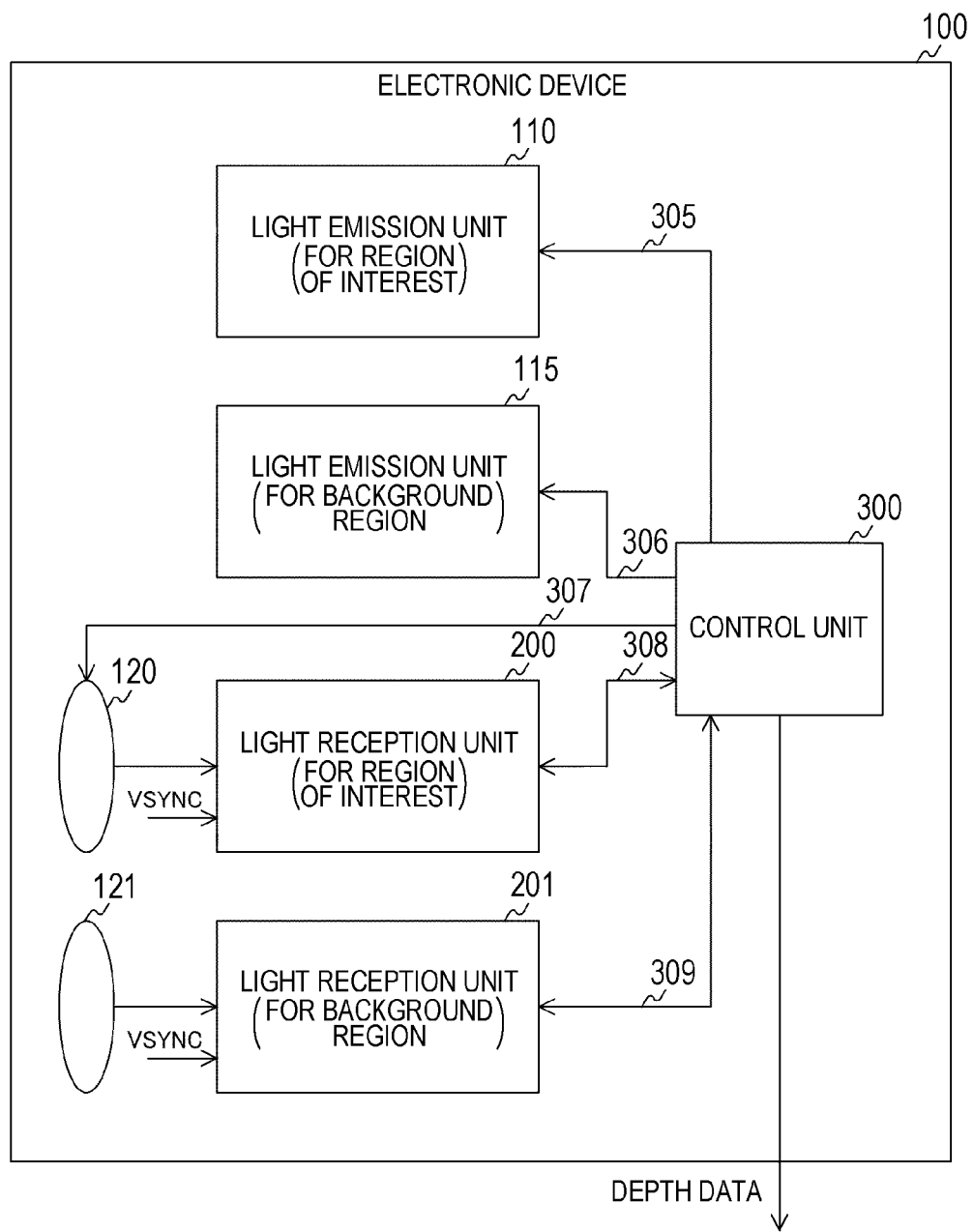
FIG. 26 is a block diagram according to a third embodiment of the present technology, showing an example configuration of an electronic device.

FIG. 26 is a block diagram according to the third embodiment of the present technology, showing an example configuration of the electronic device 100. The electronic device 100 of the third embodiment is different from that in the first embodiment in that a light emission unit 115, the optical units 120 and 121, and the light reception unit 201 are further included.

The light emission unit 110 radiates radiation light in synchronization with the clock signal CLK2 or CLK3, and the light emission unit 115 radiates radiation light in synchronization with the clock signal CLK1. Additionally, the light emission units 110 and 115 are examples of first and second light emission units described in the claims.

The optical unit 120 condenses, and guides to the light reception unit 200, reflected light from the region of interest. The optical unit 121 condenses, and guides to the light reception unit 201, reflected light from the background region. The light reception unit 200 receives the reflected light from the region of interest, and the light reception unit 201 receives the reflected light from the background region.

In an initial state, the control unit 300 drives only the light emission unit 115 and the light reception unit 201 to cause a frame to be generated. Then, in a case where there is an object, the control unit 300 controls the optical unit 120, and sets a zoom magnification according to the distance to the object. Furthermore, the control unit 300 drives and causes the light emission unit 110 to emit light in synchronization with the clock signal CLK2, and drives and causes the light reception unit 200 to generate a frame of the region of interest. Then, in a case where presence of a hand region is determined, the control unit 300 alternately sets the frequencies f2 and f3 in the light emission unit 110, and causes the light reception unit 200 to alternately generate a subframe of the hand region and a subframe of the background region.

Figure 27:
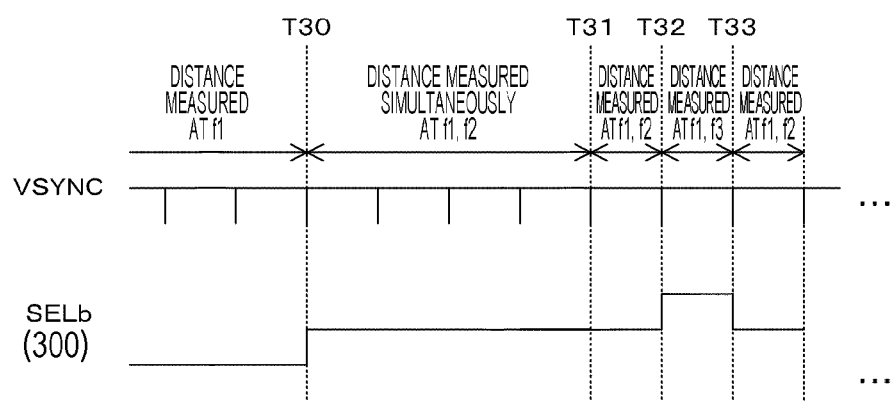
FIG. 27 is a timing chart according to the third embodiment of the present technology, showing an example of a frequency setting operation.

FIG. 27 is a timing chart according to the third embodiment of the present technology, showing an example of a frequency setting operation. After a timing T30 when presence of an object is determined, the electronic device 100 sets the frequencies f1 and f2 in the light emission units 110 and 115, causes the two to emit light at the same time, and performs distance measurement. In this manner, the control unit 300 controls the light emission units 110 and 115, and causes two beams of radiation light at mutually different frequencies to be emitted at the same time, and thus, distance measurement may be performed simultaneously at the frequencies f1 and f2. Reduction in the frame rate of a synthesized frame may thereby be suppressed.

Then, from a timing T31 when presence of a hand is determined to a timing T32, the electronic device 100 sets the frequencies f1 and f2 in the light emission units 110 and 115, causes the two to emit light at the same time, and performs distance measurement. Then, from the timing T32 to a timing T33, the electronic device 100 sets the frequencies f1 and f3 in the light emission units 110 and 115, causes the two to emit light at the same time, and performs distance measurement.

Additionally, a light emission unit, a light reception unit, and an optical unit for distance measurement in a hand region may further be included. In such a case, the added light emission unit emits light in synchronization with the clock signal CLK.

As described above, in the third embodiment of the present technology, the control unit 300 sets the frequencies f1 and f2 in the light emission units 110 and 115 and causes the two to emit light at the same time, and thus, a frame of the background region and a frame of the region of interest may be generated at the same time. Reduction in the frame rate of a synthesized frame may thereby be suppressed. Furthermore, the zoom control unit 317 increases the zoom magnification of the optical unit 120 corresponding to the region of interest, and thus, the resolution of the region of interest may be more increased than that of the background region.

4. Example Application to Mobile Body

The technology according to the present disclosure (the present technology) may be applied to various products. For example, the technology according to the present disclosure may be implemented as a device that is mounted in any type of mobile bodies including a vehicle, an electric vehicle, a hybrid electric vehicle, a motorcycle, a bicycle, a personal mobility, an aircraft, a drone, a vessel, a robot, and the like.

Figure 28:
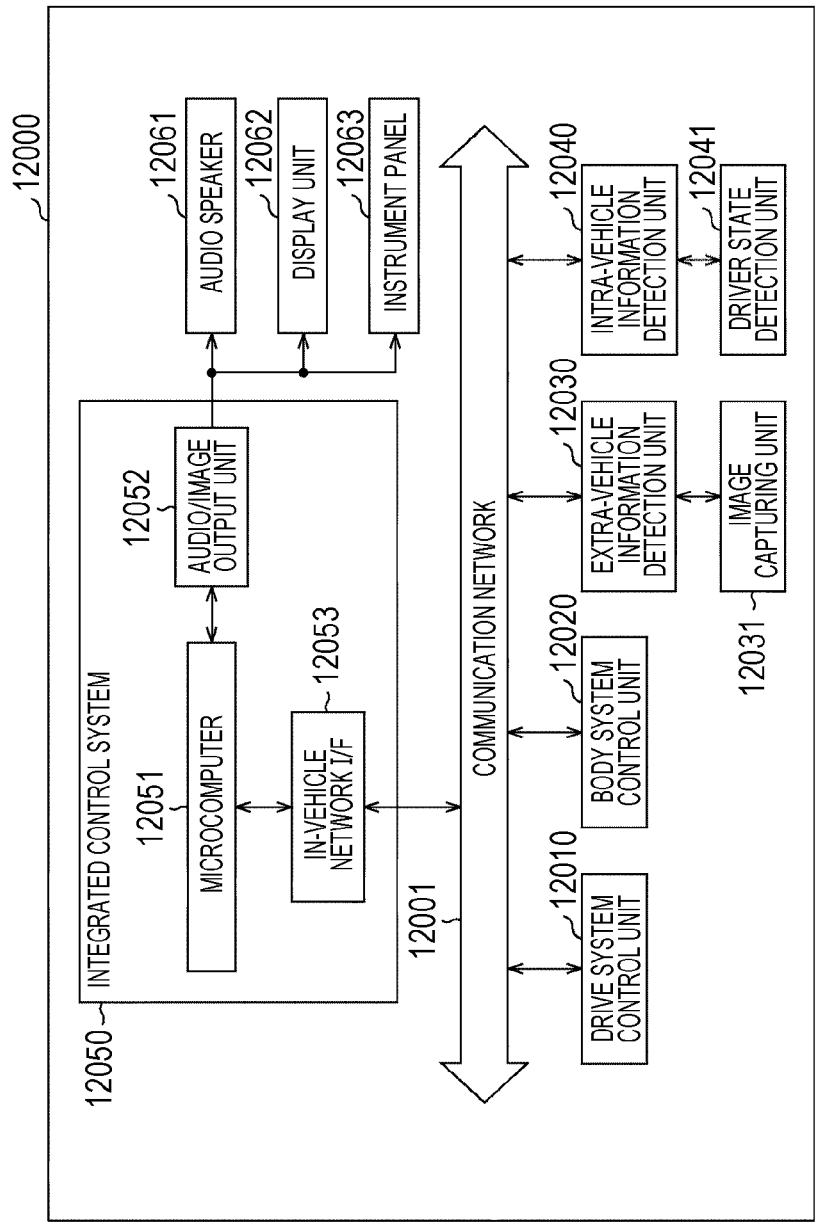
FIG. 28 is a block diagram showing a schematic example configuration of a vehicle control system.

FIG. 28 is a block diagram showing a schematic example configuration of a vehicle control system as an example of a mobile body control system to which the technology according to the present disclosure may be applied.

A vehicle control system 12000 includes a plurality of electronic control units connected by a communication network 12001. In the example shown in FIG. 28, the vehicle control system 12000 includes a drive system control unit 12010, a body system control unit 12020, an extra-vehicle information detection unit 12030, an intra-vehicle information detection unit 12040, and an integrated control unit 12050. Furthermore, a microcomputer 12051, an audio/image output unit 12052, and an in-vehicle network interface (I/F) 12053 are shown as functional elements of the integrated control unit 12050.

The drive system control unit 12010 controls operation of devices related to a drive system of a vehicle according to various programs. For example, the drive system control unit 12010 functions as a control device for a drive force generation device for generating a drive force of a vehicle, such as an internal combustion engine or a driving motor, a drive force transmission mechanism for transmitting the drive force to wheels, a steering mechanism for adjusting a steering angle of the vehicle, a braking device for generating a braking force of the vehicle, and the like.

The body system control unit 12020 controls operation of various devices mounted in a vehicle body, according to various programs. For example, the body system control unit 12020 functions as a control device for a keyless entry system, a smart key system, a power window device, or various lights such as a headlight, a reverse light, a brake light, a blinker, and a fog light. In such a case, radio waves transmitted from a portable device serving as a key or signals of various switches may be input to the body system control unit 12020. The body system control unit 12020 receives input of such radio waves or signals, and controls a door lock device, the power window device, or the lights of the vehicle.

The extra-vehicle information detection unit 12030 detects information about outside of the vehicle where the vehicle control system 12000 is mounted. For example, an image capturing unit 12031 is connected to the extra-vehicle information detection unit 12030. The extra-vehicle information detection unit 12030 causes the image capturing unit 12031 to capture an image of outside of the vehicle, and also, receives the captured image. The extra-vehicle information detection unit 12030 may perform an object detection process or a distance detection process with respect to a person, a vehicle, an obstacle, a traffic sign, letters on a road, or the like, on the basis of the received image.

The image capturing unit 12031 is a light sensor that receives light, and outputs an electrical signal according to the amount of the received light. The image capturing unit 12031 may output the electrical signal as an image, or as distance measurement information. Moreover, light that is received by the image capturing unit 12031 may be visible light, or may be invisible light such as infrared light.

The intra-vehicle information detection unit 12040 detects information about inside of the vehicle. For example, a driver state detection unit 12041 for detecting the state of a driver is connected to the intra-vehicle information detection unit 12040. For example, the driver state detection unit 12041 includes a camera for capturing an image of the driver, and the intra-vehicle information detection unit 12040 may calculate a level of fatigue or a level of concentration of the driver, or may determine whether or not the driver is asleep, on the basis of detection information input from the driver state detection unit 12041.

The microcomputer 12051 may calculate a control target value of the drive force generation device, the steering mechanism, or the braking device on the basis of information about inside or outside of the vehicle acquired by the extra-vehicle information detection unit 12030 or the intra-vehicle information detection unit 12040, and may output a control command to the drive system control unit 12010. For example, the microcomputer 12051 may perform cooperative control with the aim of implementing functions of an advanced driver assistance system (ADAS) including vehicle collision avoidance or impact reduction, follow-up driving based on an inter-vehicle distance, constant vehicle speed driving, vehicle collision warning, vehicle lane departure warning, and the like.

Furthermore, the microcomputer 12051 may perform cooperative control with the aim of performing autonomous driving according to which driving is performed autonomously without depending on operation of a driver, by controlling the drive force generation device, the steering mechanism, the braking device or the like on the basis of information about surroundings of the vehicle acquired by the extra-vehicle information detection unit 12030 or the intra-vehicle information detection unit 12040, for example.

Furthermore, the microcomputer 12051 may output a control command to the body system control unit 12020 on the basis of information about outside of the vehicle acquired by the extra-vehicle information detection unit 12030. For example, the microcomputer 12051 may perform cooperative control with the aim of preventing antidazzle, by controlling the headlight according to a position of a preceding vehicle or an oncoming vehicle detected by the extra-vehicle information detection unit 12030, and by switching from high beam to low beam, for example.

The audio/image output unit 12052 transmits an output signal of at least one of audio or image to an output device capable of visually or auditorily notifying information to a passenger of the vehicle or to outside the vehicle. In the example in FIG. 28, an audio speaker 12061, a display unit 12062, and an instrument panel 12063 are shown as the output device. For example, the display unit 12062 may include at least one of an onboard display or a head-up display.

Figure 29:
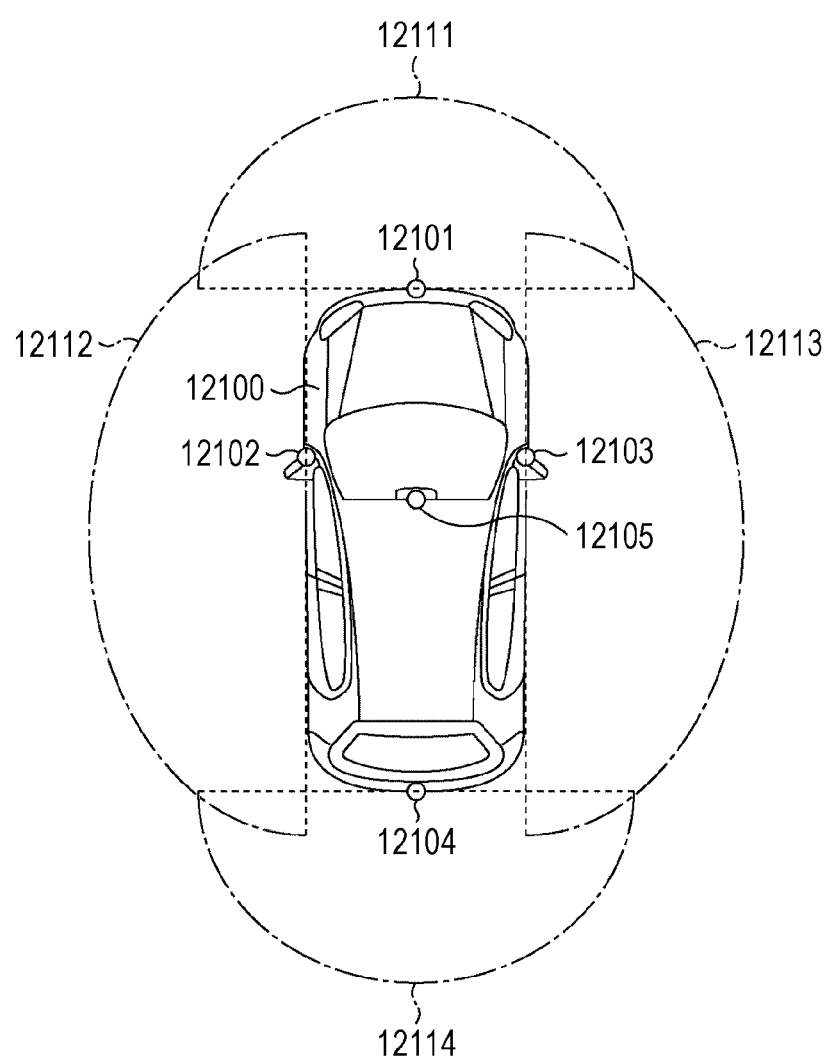
FIG. 29 is an explanatory diagram showing an example of an installation position of an image capturing unit.

FIG. 29 is an explanatory diagram showing an example of an installation position of the image capturing unit 12031.

In FIG. 29, image capturing units 12101, 12102, 12103, 12104, and 12105 are included as the image capturing unit 12031.

For example, the image capturing units 12101, 12102, 12103, 12104, and 12105 are provided at positions such as a front nose, a side mirror, a rear bumper, a back door, and an upper part of a windshield inside a vehicle compartment of a vehicle 12100. The image capturing unit 12101 provided at the front nose and the image capturing unit 12105 provided at an upper part of the windshield inside the vehicle compartment mainly capture images of an area in front of the vehicle 12100. The image capturing units 12102 and 12103 provided at the side mirrors mainly acquire images of areas on sides of the vehicle 12100. The image capturing unit 12104 provided at the rear bumper or the back door mainly acquires images of an area behind the vehicle 12100. The image capturing unit 12105 provided at an upper part of the windshield inside the vehicle compartment is mainly used for detection of a preceding vehicle, a pedestrian, an obstacle, a traffic light, a road sign, a lane, or the like.

Additionally, FIG. 29 shows an example of image capturing ranges of the image capturing units 12101 to 12104. An image capturing range 12111 indicates an image capturing range of the image capturing unit 12101 provided at the front nose, image capturing ranges 12112 and 12113 indicate capturing ranges of the image capturing units 12102 and 12103 provided at the side mirrors, respectively, and an image capturing range 12114 indicates an image capturing range of the image capturing unit 12104 provided at the rear bumper or the back door. For example, a bird's-eye view showing the vehicle 12100 from above may be obtained by superimposing pieces of image data captured by the image capturing units 12101 to 12104.

At least one of the image capturing units 12101 to 12104 may include a function of acquiring distance information. For example, at least one of the image capturing units 12101 to 12104 may be a stereo camera including a plurality of image sensors, or may be an image sensor including pixels for phase difference detection.

For example, by determining a distance to each of three-dimensional objects in the image capturing ranges 12111 to 12114 and temporal changes in the distances (relative speeds to the vehicle 12100) on the basis of distance information obtained from the image capturing units 12101 to 12104, the microcomputer 12051 may extract, as a preceding vehicle, a closest three-dimensional object which is on a traveling path of the vehicle 12100 and which is traveling at a predetermined speed (such as 0 km/h or more) in a substantially same direction as the vehicle 12100. Furthermore, the microcomputer 12051 may set in advance a distance to a preceding vehicle to be maintained, and perform automatic braking control (including following stop control), automatic acceleration control (including following start control), and the like. In this manner, cooperative control may be performed with the aim of performing autonomous driving according to which driving is performed autonomously without depending on operation of a driver.

For example, the microcomputer 12051 may classify three-dimensional object data regarding three-dimensional objects into three-dimensional objects including two-wheeled vehicles, standard-sized vehicles, large-sized vehicles, pedestrians, utility poles, and the like on the basis of distance information obtained from the image capturing units 12101 to 12104, extract the classified three-dimensional object data, and use the extracted three-dimensional object data for automatic avoidance of obstacles. For example, the microcomputer 12051 identifies obstacles around the vehicle 12100 as obstacles that a driver of the vehicle 12100 can visually recognize and obstacles that are difficult for the driver to visually recognize. Then, the microcomputer 12051 determines a collision risk indicating a level of risk of colliding into each obstacle, and in a situation where the collision risk is a set value or more and there is a possibility of collision, the microcomputer 12051 may assist in driving to avoid collision, by outputting a warning to the driver via the audio speaker 12061 or the display unit 12062 or by performing forced deceleration or avoidance steering via the drive system control unit 12010.

At least one of the image capturing units 12101 to 12104 may be an infrared camera that detects infrared light. For example, the microcomputer 12051 may recognize a pedestrian by determining whether or not there is a pedestrian in captured images of the image capturing units 12101 to 12104. For example, such recognition of a pedestrian is performed by a procedure of extracting feature points in the captured images of the image capturing units 12101 to 12104 as infrared cameras, and a procedure of determining whether or not an object is a pedestrian by performing a pattern matching process on a series of feature points indicating a contour of the object. In a case where the microcomputer 12051 determines presence of a pedestrian in the captured images of the image capturing units 12101 to 12104 and recognizes the pedestrian, the audio/image output unit 12052 controls the display unit 12062 such that a square contour line for emphasizing the recognized pedestrian is displayed in a superimposed manner. Furthermore, the audio/image output unit 12052 may control the display unit 12062 such that an icon or the like indicating the pedestrian is displayed at a desired position.

Heretofore, a description has been given of an example of the vehicle control system to which the technology according to the present disclosure may be applied. The technology according to the present disclosure may be applied to the extra-vehicle information detection unit 12030 among the elements described above, for example. Specifically, the electronic device 100 in FIG. 1 may be applied to the extra-vehicle information detection unit 12030. Application of the technology according to the present disclosure to the extra-vehicle information detection unit 12030 enables setting of an appropriate frequency according to the distance to an object, and distance measurement accuracy may thus be increased.

Additionally, the embodiments described above are examples of embodying the present technology, and matters in the embodiments and invention-specifying matters in the claims have correspondence relationships, respectively. Similarly, the invention-specifying matters in the claims and the matters in the embodiments of the present technology assigned with the same names have correspondence relationships, respectively. However, the present technology is not limited to the embodiments, and may be embodied by subjecting the embodiments to various modifications within the scope of the present technology.

Furthermore, the processing procedures described in the above embodiments may be considered to be methods having such series of procedures, or may be considered to be programs for causing a computer to perform the series of procedures and a recording medium storing the programs. For example, as the recording medium, a compact disc (CD), a mini disc (MD), a digital versatile disc (DVD), a memory card, a Blu-ray (registered trademark) Disc, and the like may be used.

Additionally, the effects described in the present specification are only examples and are not restrictive, and other effects may also be achieved.

Additionally, the present technology may also be configured in the following manner.

(1) An electronic device including:

a light emission unit configured to radiate intermittent light in synchronization with a synchronization signal at a set frequency that is set;

a light reception unit configured to generate received light data by receiving reflected light of the intermittent light;

a determination unit configured to determine presence or absence of a predetermined object on the basis of the received light data; and a setting unit configured to set, in the light emission unit, as the set frequency, a frequency that is higher, the smaller a distance to the predetermined object, in a case where presence of the predetermined object is determined.

(2) The electronic device according to (1) described above, in which, in an initial state, the setting unit sets a first frequency as the set frequency, and in a case where presence of the predetermined object is determined, the setting unit sets a second frequency that is higher, the smaller the measured distance, as the set frequency.

(3) The electronic device according to (2) described above, in which, in a case of determining presence of the predetermined object, the determination unit determines presence or absence of a specific part in the predetermined object, and in a case where presence of the specific part is determined, the setting unit sets a third frequency that is higher, the smaller a distance to the specific part, as the set frequency.

(4) The electronic device according to (2) or (3) described above, further including a frequency control unit configured to alternately switch between the first frequency and the second frequency every specific period of time, in a case where the second frequency is set.

(5) The electronic device according to (4) described above, in which the light reception unit includes a pixel array unit where a plurality of pixels is arrayed in a two-dimensional lattice, and a driver configured to alternately perform, in a case where presence of the predetermined object is determined, a process of driving, over a specific period of time, a pixel, among the plurality of pixels, that receives the reflected light from other than the predetermined object and of causing image data including the received light data to be output as a first subframe, and a process of driving, over the specific period of time, a pixel, among the plurality of pixels, that receives the reflected light from the predetermined object and of causing image data including the received light data to be output as a second subframe.

(6) The electronic device according to (5) described above, further including a synthesis processing unit configured to synthesize the first subframe and the second subframe, and to generate distance data on the basis of data obtained by synthesis.

(7) The electronic device according to any one of (1) to (6) described above, in which the light reception unit includes a first light reception unit and a second light reception unit each configured to radiate intermittent light in synchronization with a synchronization signal at the set frequency, and in an initial state, the setting unit sets, in the first light reception unit, the first frequency as the set frequency, and in a case where presence of the predetermined object is determined, the setting unit sets, in the second light reception unit, a second frequency that is higher, the smaller the measured distance, as the set frequency.

(8) The electronic device according to (7) described above, further including:

a first optical unit configured to condense the intermittent light, and to guide the intermittent light to the first light reception unit;

a second optical unit configured to condense the intermittent light, and to guide the intermittent light to the first light reception unit; and a zoom control unit configured to control a zoom magnification of the first optical unit on the basis of the measured distance.

(9) The electronic device according to (8) described above, in which the light emission unit includes a first light emission unit and a second light emission unit each configured to radiate intermittent light in synchronization with a synchronization signal at the set frequency, and in an initial state, the setting unit sets, in the first light emission unit, the first frequency as the set frequency, and in a case where presence of the predetermined object is determined, the setting unit sets, in the second light emission unit, the second frequency that is higher, the smaller the measured distance, as the set frequency.

(10) The electronic device according to any one of (1) to (9) described above, in which the light reception unit generates, in a chronological order, a plurality of pieces of image data each including a predetermined number of pieces of the received light data, and the determination unit determines presence or absence of the predetermined object on the basis of a difference between two pieces of image data, among the plurality of pieces of image data, that are adjacent to each other in the chronological order.

(11) The electronic device according to (10) described above, in which the determination unit further calculates a statistic of distance on the basis of the received light data, and determines presence or absence of the predetermined object on the basis of the difference and the statistic.

(12) A control method of an electronic device, the method including:

a light emission step of radiating intermittent light in synchronization with a synchronization signal at a set frequency that is set;

a light reception step of generating received light data by receiving reflected light of the intermittent light;

a determination step of determining presence or absence of a predetermined object on the basis of the received light data; and a setting step of setting, in the light emission unit, as the set frequency, a frequency that is higher, the smaller a distance to the predetermined object, in a case where presence of the predetermined object is determined.

REFERENCE SIGNS LIST

100 Electronic device
110, 115 Light emission unit
111 Light source
112 Light emission control unit
120, 121 Optical unit
200, 201 Light reception unit
211 MX driver
212 V scanner
213 V driver
214 DAC
215 Column signal processing unit
216 H scanner
217 Clock switching unit
220 Pixel array unit
230 A pixel
231, 241 Reset transistor
232, 242 Photodiode
233, 243 Transfer transistor
234, 244 Connection transistor
235, 245 Floating diffusion layer
236, 246 Amplifying transistor
237, 247 Select transistor
240 B pixel
300 Control unit
311 Region control unit
312 Synthesis processing unit
313 Clock supply unit
314 Frequency control unit
315 Depth data output unit
316 Phase synchronization circuit
317 Zoom control unit
320 Difference calculation unit
321 Write control unit
322, 323, 324 Background region buffer
325, 326, 327, 331, 332, 333 Subtractor
328, 329, 330 Region-of-interest buffer
334, 335, 336 Hand region buffer
350 Region determination/distance measurement unit
351 Candidate region-of-interest extraction unit
352 Candidate hand region extraction unit
353 Region-of-interest determination unit
354 Hand region determination unit
355 Frequency determination unit
356 Synthesis control unit
357 Light emission frequency control unit
358 Frequency table
12030 Extra-vehicle information detection unit

The invention claimed is:

1. An electronic device comprising:
a light emission circuitry configured to radiate intermittent light in synchronization with a synchronization signal at a set frequency that is set from a range of frequencies;
a light reception circuitry configured to generate received light data by receiving reflected light of the intermittent light; and
an electronic controller including a determination program and a setting program, the electronic controller configured to
execute the determination program to determine a presence or an absence of a predetermined object on a basis of the received light data; and
execute the setting program to set, in the light emission circuitry, as the set frequency, a frequency that is higher, the smaller a distance to the predetermined object, in a case where the presence of the predetermined object is determined,
wherein, in an initial state, the electronic controller, in executing the setting program, sets a first frequency as the set frequency, and in a case where the presence of the predetermined object is determined, the electronic controller, in executing the setting program, sets a second frequency that is higher, the smaller the distance to the predetermined object, as the set frequency,
wherein in a case of determining the presence of the predetermined object, the electronic controller, in executing the determination program, is configured to determine a presence or an absence of a specific part of the predetermined object, and
wherein in a case where the presence of the specific part is determined, the electronic controller, in executing the setting program, sets a third frequency that is higher, the smaller a distance to the specific part, as the set frequency,
wherein the first frequency is a lowest frequency in the range of frequencies.

2. An electronic device comprising:
a light emission circuitry configured to radiate intermittent light in synchronization with a synchronization signal at a set frequency that is set;
a light reception circuitry configured to generate received light data by receiving reflected light of the intermittent light; and
an electronic controller including a determination program, a setting program, and a frequency control program, the electronic controller configured to
execute the determination program to determine a presence or an absence of a predetermined object on a basis of the received light data;
execute the setting program to set, in the light emission circuitry, as the set frequency, a frequency that is higher, the smaller a distance to the predetermined object, in a case where the presence of the predetermined object is determined,
wherein, in an initial state, the electronic controller, in executing the setting program, sets a first frequency as the set frequency, and in a case where the presence of the predetermined object is determined, the electronic controller, in executing the setting program, sets a second frequency that is higher, the smaller the distance to the predetermined object, as the set frequency; and
execute the frequency control program to alternately switch between the first frequency and the second frequency every specific period of time, in a case where the second frequency is set.

3. The electronic device according to claim 2, wherein the light reception circuitry includes
a pixel array unit where a plurality of pixels is arrayed in a two-dimensional lattice, and
a driver configured to alternately perform, in a case where the presence of the predetermined object is determined, a first process of driving, over a first specific period of time, a first pixel, among the plurality of pixels, that receives the reflected light from other than the predetermined object and of causing image data including the received light data to be output as a first subframe, and a second process of driving, over the first specific period of time, a second pixel, among the plurality of pixels, that receives the reflected light from the predetermined object and of causing image data including the received light data to be output as a second subframe.

4. The electronic device according to claim 3, wherein the electronic controller further includes a synthesis processing program, and wherein the electronic controller is further configured to execute the synthesis processing program to
synthesize the first subframe and the second subframe, and
generate distance data on a basis of data obtained by synthesis.

5. An electronic device comprising:
a light emission circuitry configured to radiate intermittent light in synchronization with a synchronization signal at a set frequency that is set;
a light reception circuitry configured to generate received light data by receiving reflected light of the intermittent light; and
an electronic controller including a determination program and a setting program, the electronic controller configured to
execute the determination program to determine a presence or an absence of a predetermined object on a basis of the received light data; and
execute the setting program to set, in the light emission circuitry, as the set frequency, a frequency that is higher, the smaller a distance to the predetermined object, in a case where the presence of the predetermined object is determined,
wherein the light reception circuitry includes a first light reception circuitry and a second light reception circuitry, and each of the first light reception circuitry and the second light reception circuitry is configured to receive the intermittent light in synchronization with a first synchronization signal at the set frequency, and
wherein in an initial state, the electronic controller, in executing the setting program, sets, in the first light reception circuitry, a first frequency as the set frequency, and in a case where the presence of the predetermined object is determined, the electronic controller, in executing the setting program, sets, in the second light reception circuitry, a second frequency that is higher, the smaller the distance to the predetermined object, as the set frequency.

6. The electronic device according to claim 5, further comprising:
a first optical device configured to
condense the intermittent light, and
guide the intermittent light to the first light reception circuitry; and
a second optical device configured to
condense the intermittent light, and
guide the intermittent light to the first light reception circuitry,
wherein the electronic controller further includes a zoom control program, and
wherein, in executing the zoom control program, the electronic controller is configured to control a zoom magnification of the first optical device on a basis of the distance to the predetermined object.

7. The electronic device according to claim 6, wherein
the light emission circuitry includes a first light emission circuitry and a second light emission circuitry, and each of the first light emission circuitry and the second light emission circuitry is configured to radiate the intermittent light in synchronization with a second synchronization signal at the set frequency, and
wherein, in the initial state, the electronic controller, in executing the setting program, sets, in the first light emission circuitry, the first frequency as the set frequency, and in a case where the presence of the predetermined object is determined, the electronic controller, in executing the setting program, sets, in the second light emission circuitry, the second frequency that is higher, the smaller the distance to the predetermined object, as the set frequency.

8. The electronic device according to claim 1, wherein the distance to the predetermined object that is determined is less than fifteen meters (m) and the second frequency is one hundred megahertz (MHz).

9. The electronic device according to claim 1, wherein the distance to the predetermined object that is determined is fifteen meters (m) or more and the second frequency is ten megahertz (MHz).

10. The electronic device according to claim 1, wherein the distance to the specific part is less than fifteen meters (m) and the third frequency is one hundred megahertz (MHz).

11. The electronic device according to claim 1, wherein the distance to the specific part is fifteen meters (m) or more and the third frequency is ten megahertz (MHz).

12. The electronic device according to claim 2, wherein the distance to the predetermined object that is determined is less than fifteen meters (m) and the second frequency is one hundred megahertz (MHz).

13. The electronic device according to claim 2, wherein the distance to the predetermined object that is determined is fifteen meters (m) or more and the second frequency is ten megahertz (MHz).

14. The electronic device according to claim 5, wherein the distance to the predetermined object that is determined is less than fifteen meters (m) and the second frequency is one hundred megahertz (MHz).

15. The electronic device according to claim 5, wherein the distance to the predetermined object that is determined is fifteen meters (m) or more and the second frequency is ten megahertz (MHz).

* * * * *